(12) United States Patent
Uchida et al.

(10) Patent No.: US 8,956,690 B2
(45) Date of Patent: Feb. 17, 2015

(54) LAMINATED BODY FOR MANUFACTURING RESIN MOLD, LAMINATED BODY, RESIN MOLD AND METHOD FOR MANUFACTURING MAGNETIC RECORDING MEDIUM

(75) Inventors: Hiroshi Uchida, Oita (JP); Tomokazu Umezawa, Chiba (JP); Masato Fukushima, Chiba (JP); Shunsuke Takeyama, Yokohama (JP); Takanori Sakuragi, Hiratsuka (JP)

(73) Assignee: Showa Denko K.K., Tokyo (JP)

( * ) Notice: Subject to any disclaimer, the term of this patent is extended or adjusted under 35 U.S.C. 154(b) by 1018 days.

(21) Appl. No.: 12/993,208

(22) PCT Filed: May 22, 2009

(86) PCT No.: PCT/JP2009/059432
§ 371 (c)(1),
(2), (4) Date: Nov. 17, 2010

(87) PCT Pub. No.: WO2009/142295
PCT Pub. Date: Nov. 26, 2009

(65) Prior Publication Data
US 2011/0064871 A1    Mar. 17, 2011

(30) Foreign Application Priority Data

May 23, 2008   (JP) ................................ 2008-135989
May 23, 2008   (JP) ................................ 2008-135990

(51) Int. Cl.
*B05D 5/00*   (2006.01)
*G11B 5/855*  (2006.01)
*B29C 33/38*  (2006.01)
*B29C 33/42*  (2006.01)

(52) U.S. Cl.
CPC ............ *G11B 5/855* (2013.01); *B29C 33/3842* (2013.01); *B29C 33/424* (2013.01)
USPC ............................ 427/128; 264/447; 427/256

(58) Field of Classification Search
CPC ........... B05D 5/00; B32B 27/36; B29C 33/00
USPC ................ 427/128, 129, 130, 131, 132, 256; 264/447
See application file for complete search history.

(56) References Cited

U.S. PATENT DOCUMENTS

2004/0101713 A1    5/2004   Wachenschwanz et al.
2005/0036223 A1    2/2005   Wachenschwanz et al.
(Continued)

FOREIGN PATENT DOCUMENTS

CN    1591047 A    3/2005
CN    101151132 A  3/2008
(Continued)

OTHER PUBLICATIONS

Stephen Y. Chou et al., "Imprint of Sub-25 nm Vias and Trenches in Polymers", Appl. Phys. Lett., Nov. 20, 1995, vol. 67 No. 21, pp. 3114 to 3116.
(Continued)

*Primary Examiner* — Michael Cleveland
*Assistant Examiner* — Tabassom Tadayyon Eslami
(74) *Attorney, Agent, or Firm* — Sughrue Mion, PLLC

(57) ABSTRACT

A laminated body which forms a resin mold by compression molding using a master mold, the laminated body having: a pair of mutually facing base materials, a layer of a liquid or gel-like curable resin material sandwiched between the pair of base materials, and one or more flow suppression bodies, which are composed of a cured product of the curable resin material and are sandwiched between the pair of base materials, wherein the layer of the curable resin material is sealed by the pair of base materials and the flow suppression bodies. Also, a method for manufacturing a resin mold using the laminated body.

11 Claims, 12 Drawing Sheets

(56) References Cited

U.S. PATENT DOCUMENTS

| | | | |
|---|---|---|---|
| 2006/0279025 A1* | 12/2006 | Heidari et al. | 264/496 |
| 2007/0007675 A1* | 1/2007 | Nakagawa | 264/1.7 |
| 2009/0004320 A1* | 1/2009 | Ohashi et al. | 425/385 |
| 2009/0273861 A1* | 11/2009 | Tanaka et al. | 360/254 |
| 2011/0076353 A1* | 3/2011 | Shirai et al. | 425/385 |

FOREIGN PATENT DOCUMENTS

| | | | | |
|---|---|---|---|---|
| JP | 63-307908 | A | | 12/1988 |
| JP | 2004-178793 | A | | 6/2004 |
| JP | 2004-178794 | A | | 6/2004 |
| JP | 2005-122047 | A | | 5/2005 |
| JP | 207-015334 | | * | 1/2007 |
| JP | 2007-015334 | A | | 1/2007 |
| JP | 2007-245684 | A | | 9/2007 |

OTHER PUBLICATIONS

Chinese Office Action for Application No. 200980118131.7 dated Nov. 5, 2012.

* cited by examiner

STEP A

STEP B

STEP C

STEP D

STEP E

STEP F

STEP G

STEP H

STEP I

LAMINATED BODY FOR MANUFACTURING RESIN MOLD, LAMINATED BODY, RESIN MOLD AND METHOD FOR MANUFACTURING MAGNETIC RECORDING MEDIUM

TECHNICAL FIELD

The present invention relates to a laminated body for manufacturing a resin mold and a method for manufacturing the same, as well as a method for manufacturing a resin mold and a method for manufacturing a magnetic recording medium.

Priority is claimed on Japanese Patent Application No. 2008-135989 and Japanese Patent Application No. 2008-135990, both filed May 23, 2008, the contents of which are incorporated herein by reference.

BACKGROUND ART

In fields such as semiconductor manufacturing, nanoimprint methods have begun to attract considerable attention as a technology that is capable of forming ultra fine patterns of 100 nm or less and providing excellent mass production applicability at minimal cost. In a nanoimprint method, a mold which has a pattern of protrusions and recesses to be transferred is pressed against a transfer target material composed of a photocurable resin or a thermosetting resin, and the transfer target material is then cured by the irradiation of light or application of heat, thereby transferring the pattern to the transfer target material. Of such methods, transfer methods that use a photocurable resin are referred to as photo nanoimprint methods, whereas transfer methods that use a thermosetting resin are referred to as thermal nanoimprint methods.

The nanoimprint mold having the fine transfer pattern formed thereon is generally formed from silicon, a silicon oxide, nickel or quartz glass or the like. Further, as the transfer target material, thermoplastic resins such as poly(methyl methacrylate) (PMMA) and polyimides (PI), photocurable resins such as polyester alkyd resins (PAK), and high-viscosity resins such as hydrogen silsesquioxane resins (HSQ) and spin-on-glass (SOG) materials are often used.

In recent years, the range of applications for magnetic recording devices such as magnetic disk devices, flexible disk devices and magnetic tape devices has expanded enormously, and the importance of such devices continues to increase. At the same time, the recording density of the magnetic recording media used in these devices has also required to increase markedly. Particularly since the introduction of magnetoresistive (MR) heads and PRML techniques, the increase in surface recording densities has become even more dramatic, and the more recent introduction of giant magnetoresistive (GMR) heads and tunnel magnetoresistive (TMR) heads and the like has meant that recording densities continue to increase at a pace of approximately 100% per year. However, there are strong demands for even higher recording densities for these magnetic recording media, and meeting these demands requires further improvements in the coercive force and signal to noise ratio (SNR) of the magnetic layer, and higher levels of resolution. Furthermore, in recent years, concurrently with the improvements in linear recording density, efforts are also continuing into raising the surface recording density by increasing the track density.

In the most recent magnetic recording devices, the track density has reached 110 kTPI. However, as the track density is increased, mutual interference tends to occur between the magnetically recorded information within adjacent tracks, and the resulting magnetized transition region in the boundary region between the tracks acts as a noise source, causing problems such as a deterioration in the SNR. This reduced SNR leads directly to a deterioration of the bit error rate, and is therefore an impediment to achieving increased recording densities.

In order to increase the surface recording density, it is necessary to reduce the size of each recording bit on the magnetic recording medium, and maximize the saturation magnetization and magnetic film thickness for each recording bit. However, as the recording bits are reduced in size, the minimum magnetization volume per bit is reduced, and a problem arises in that recording data may be erased due to magnetization reversal caused by heat fluctuation.

Further, because the distance between tracks narrows, the magnetic recording device requires extremely high-precision track servo technology, and in addition to employing such technology, a method is usually employed where recording is executed over a comparatively wide range, and reproduction is then executed across a narrower range than that used during recording in order to exclude, as far as possible, effects from adjacent tracks. Although this method enables inter-track effects to be suppressed to a minimum, achieving a satisfactory reproduction output level can be difficult, and therefore ensuring an adequate SNR is also difficult.

One method that is being investigated as a method capable of addressing the above problem of thermal fluctuation, ensuring a satisfactory SNR, and achieving a satisfactory output is a method in which the track density is increased by physically separating adjacent recording tracks, either by forming a pattern of protrusions and recesses (in which the peaks and depressions may also be referred to as "lands and grooves") that coincides with the track pattern on the magnetic recording medium, or by forming a non-magnetic portion between adjacent tracks. Hereinafter, this method is referred to as the discrete track method.

One example of a known discrete track magnetic recording medium is a medium in which a magnetic recording medium is formed on a non-magnetic substrate which has a pattern of protrusions and recesses on the surface thereof, thereby forming magnetic recording tracks and servo signal patterns that are physically separated from each other (for example, see Patent Document 1).

In this magnetic recording medium, a ferromagnetic layer is formed on the surface of the substrate having a plurality of lands and grooves, with a soft magnetic layer disposed therebetween, and a protective film is then formed on the surface of the ferromagnetic layer. In this magnetic recording medium, the magnetic recording regions are formed on the land regions, and are magnetically separated from the surrounding regions.

According to this magnetic recording medium, the occurrence of magnetic domain walls within the soft magnetic layer can be inhibited, meaning thermal fluctuations are less likely to have an effect, and because there is no interference between adjacent signals, a high-density magnetic recording medium that suffers minimal noise can be formed.

Discrete track methods include methods in which a magnetic recording medium composed of a plurality of thin films is formed, and the tracks are then formed, and methods in which a pattern of protrusions and recesses is first formed, either directly on the substrate surface or within a thin layer provided for the purpose of track formation, and thin film formation (magnetic layer formation) of the magnetic recording medium is then conducted (for example, see Patent Document 2 and Patent Document 3). Of these, the former method is referred to as a magnetic layer processing method, whereas the latter is referred to as a pre-emboss method.

In the latter pre-emboss method, physical processing of the substrate surface is completed prior to formation of the medium. This offers the advantages that the manufacturing process can be simplified, and that the medium is resistant to contamination during the manufacturing process. However, the shape of the pattern of protrusions and recesses formed on the substrate is inherited by the subsequently deposited films, and as a result, a problem arises in that the floating position and floating height of the recording/reproducing head that performs recording or reproduction while floating across the surface of the medium cannot be stabilized.

One example of a method that has been proposed for manufacturing a magnetic recording medium using the former magnetic layer processing method is a method that uses the nanoimprint method described above in a similar manner to that employed for semiconductor manufacture. Specifically, a method has been proposed in which a continuous magnetic layer deposited on a substrate is processed to form a magnetic recording track pattern or bit pattern using a nanoimprint method.

As described above, the nanoimprint method is a method in which a mold having a pattern of protrusions and recesses that is to be transferred formed on the surface thereof is pressed against a transfer target material, and the transfer target material is then cured by the irradiation of light or the application of heat, thereby transferring the pattern of protrusions and recesses to the transfer target material.

The mold for nanoimprinting is, for example, a mold prepared by forming an ultra fine pattern which has recessed and protruding portions and is 100 nm or less in the surface of a silicon material or the like, and is very expensive. If this mold suffers abrasion or damage during the imprint process, then the mold must be replaced, which results in an increase in the manufacturing cost of the magnetic recording medium product or semiconductor or the like manufactured using the nanoimprint method. Accordingly, in those cases where the nanoimprint method is employed in an industrial setting, a replica mold is usually manufactured in order to preserve the master mold. In other words, the pattern of the master mold is transferred to another material using a stamper device, enabling a plurality of replica molds to be manufactured from a single master mold.

Because these replica molds are produced in large quantities, they are inexpensive. Consequently, if a replica mold is used as the stamper in a nanoimprint process, then even if the mold is damaged, it can be simply replaced with another replica mold, meaning the valuable master mold can be preserved. As a result, a product which has a fine pattern of protrusions and recesses formed thereon can be manufactured at low cost using the nanoimprint method.

The use of resin molds as the replica molds manufactured using the method outlined above is currently under investigation, and for example, methods of transferring a fine pattern using a photocuring reaction (for example, see Non-Patent Document 1) and methods of suppressing shrinkage during such photocuring (for example, see Non-Patent Document 1) have been disclosed.

As a result of demands for finer processing during the manufacture of semiconductors and magnetic recording media, there are increasing demands for the formation of ever finer patterns on nanoimprint molds. For example, when manufacturing a magnetic recording medium or the like using the nanoimprint method, making the magnetic recording pattern finer in order to achieve increased recording density requires that a finer pattern is formed on the nanoimprint mold.

However formation of a finer pattern on the nanoimprint mold tends to accelerate abrasion of the mold and increase the frequency of mold damage. Moreover, because the lifespan of a resin replica mold is shorter than that of a metal mold, if a resin mold is to be used, then it is necessary to ensure that a large number of replica molds is available. Accordingly, it is desirable that the replica molds are able to be manufactured in a large quantity at a good level of productivity.

The material to which the pattern of the master mold, which has recessed and protruding portions, is to be transferred must exhibit curability, good flexibility and superior filling properties, and have a uniform thickness. One possible method for satisfying these demands is a method in which a gel-like curable resin is printed onto a base film, and this printed film is then used as the transfer material into which the master mold is pressed.

In order to ensure that the printed film is retained in a film-like form of uniform thickness, it is necessary that the resin being printed has a certain degree of viscosity. However, if this viscosity of the curable resin increases, then the ability of the resin to fill the gaps within the pattern of protrusions and recesses during pattern transfer from the master mold tends to deteriorate, resulting in a deterioration in the precision of the transfer.

Further, another possible method involves providing weirs in advance on the surface of the base film, pouring a liquid curable resin into the well inside the weirs, and then stamping the master mold onto the resulting curable resin layer. However, this method tends to require large manufacturing equipment, and has a low level of productivity. Moreover, obtaining a uniform thin layer using this type of method tends to be difficult.

Furthermore, yet another method involves using spin coating to form a thin film of a curable resin on a base film, and then using this thin film as the transfer material into which the master mold is pressed, but this method tends to require even larger manufacturing equipment, and suffers from inferior productivity.

Accordingly, the productivity cannot be improved with these methods, and the precision of the pattern transfer may deteriorate. As a result, if a semiconductor is manufactured using the nanoimprint method, then in a similar manner, the productivity of the semiconductor cannot be improved, and the precision of the pattern transfer tends to deteriorate. Moreover, if a magnetic recording medium is manufactured using the nanoimprint method, then the recording density of the magnetic recording medium tends to worsen, and the productivity may deteriorate.

PRIOR ART DOCUMENTS

Patent Documents

[Patent Document 1]
Japanese Unexamined Patent Application, First Publication No. 2005-122047
[Patent Document 2]
Japanese Unexamined Patent Application, First Publication No. 2004-178793
[Patent Document 3]
Japanese Unexamined Patent Application, First Publication No. 2004-178794

[Patent Document 4]
Japanese Unexamined Patent Application, First Publication No. 2005-122047

Non-Patent Documents

[Non-Patent Document 1]
Stephen Y. Chou, Applied Physics Letters, American Institute of Physics, volume 67, issue 21, Nov. 20, 1995, pp. 3114 to 3116

DISCLOSURE OF INVENTION

Problems to be Solved by the Invention

A first aspect and second aspect of the present invention have been developed in light of the problems mentioned above, and have an object of providing a laminated body for manufacturing a resin mold that enables a resin replica mold having a fine pattern of protrusions and recesses formed thereon to be manufactured with superior precision, in large quantities, and at a high level of productivity, as well as providing a method for manufacturing the laminated body, and a resin replica mold.

A third aspect of the present invention has also been developed in light of the problems mentioned above, and has an object of providing a method for manufacturing a magnetic recording medium that enables a magnetic recording medium which is capable of realizing a high recording density to be manufactured inexpensively and at a high level of productivity.

Means to Solve the Problems

As a result of intensive investigation aimed at achieving the object of the above-mentioned first and second aspects, the inventors of the present invention discovered that by sandwiching a low-viscosity curable resin material between a pair of mutually opposing base materials, and surrounding the periphery of the curable resin material with a cured product of the curable resin material, the above object could be achieved, and they were therefore able to complete the first and second aspects of the present invention.

In other words, the first aspect of the present invention is as described below. [2] to [9] represent preferred examples of this aspect.

[1] A laminated body which forms a resin mold by compression molding using a master mold, the laminated body having:
  a pair of mutually facing base materials,
  a layer of a liquid or gel-like curable resin material sandwiched between the pair of base materials, and
  one or more flow suppression bodies, which are composed of a cured product of the curable resin material and are sandwiched between the pair of base materials, wherein
  the layer of the curable resin material is sealed by the pair of base materials and the one or more flow suppression bodies.

[2] The laminated body which forms a resin mold according to [1], wherein the viscosity of the liquid or gel-like curable resin material is not more than 10 Pa·s.

[3] The laminated body which forms a resin mold according to [1] or [2], wherein the curable resin material is a resin material having one or more reactive groups selected from the group consisting of a (meth)acryl group, oxetanyl group, cyclohexene oxide group and vinyl ether group.

[4] The laminated body which forms a resin mold according to any one of [1] to [3], wherein the curable resin material is a radiation-curable resin material, and the cured product of the curable resin material is a cured product obtained by curing the curable resin material by irradiation of radiation.

[5] The laminated body which forms a resin mold according to [4], wherein the radiation-curable resin material includes a resin that exhibits curability relative to radiation having a wavelength within a range from 300 to 400 nm, and following curing, the cured product exhibits a transmittance of at least 20% for radiation having a wavelength within a range from 300 to 400 nm, and has a tensile elastic modulus at a temperature of 25° C. of not less than 1.3 GPa.

[6] The laminated body which forms a resin mold according to any one of [1] to [5], wherein the pair of base materials is composed of a pair of resin films, and at least one of the resin films transmits radiation.

[7] The laminated body which forms a resin mold according to any one of [1] to [6], wherein at least one of the pair of base materials is composed of a material from which a cured product of the curable resin material is detachable.

[8] The laminated body which forms a resin mold according to [1] or [2], wherein the pair of base materials is formed from a thermoplastic resin or thermosetting resin having a glass transition temperature (Tg) that is higher than the heating temperature used during compression molding.

[9] A method for manufacturing a resin mold, the method including:
  detaching one of the base materials from the laminated body which forms a resin mold according to any one of [1] to [8], thereby exposing the layer of the curable resin material,
  pressing a master mold which has a pattern of protrusions and recesses formed thereon against the exposed layer of the curable resin material,
  curing the layer of the curable resin material with the master mold still pressed against the layer, thereby forming a resin mold, and
  detaching the resin mold from the master mold.

The second aspect of the present invention is as described below.

[10] A method for manufacturing a laminated body which forms a resin mold, the method including sandwiching a liquid or gel-like curable resin material between a pair of mutually opposing base materials, and curing only the peripheral portions of the curable resin material.

Further, the inventors of the present invention also discovered that by using the above laminated body for manufacturing a mold for use in the manufacture of a magnetic recording medium, the object described above could be achieved, and they were therefore able to complete the third aspect of the present invention.

In other words, the third aspect of the present invention is as described below. [12] to [16] represent preferred examples of this aspect.

[11] A method for manufacturing a magnetic recording medium having a magnetically separated magnetic recording pattern, the method including:
  forming a magnetic layer on at least one surface of a substrate,
  forming a resist film on the surface of the magnetic layer,
  pressing a resin mold having a pattern of protrusions and recesses formed thereon against the resist film, thereby transferring the pattern of protrusions and recesses on the resin mold to the resist film,
  detaching the mold from the resist film, and
  using the transferred pattern to form a magnetic recording pattern on the magnetic layer, wherein the method also includes, as a process for manufacturing the mold, sandwiching a liquid or gel-like curable resin material between a pair of mutually opposing base materials, and curing only the peripheral portions of the curable resin material to obtain a laminated body, detaching one of the base materials from the laminated body to expose the layer of the curable resin material, pressing a master mold having a pattern of protrusions and recesses formed thereon against the exposed layer of the curable resin material, curing the layer of the curable resin material with the master mold still pressed against the layer, thereby forming a resin mold, and detaching the resin mold from the master mold.

[12] The method for manufacturing a magnetic recording medium according to [11], wherein the viscosity of the liquid or gel-like curable resin material is not more than 10 Pa·s.

[13] The method for manufacturing a magnetic recording medium according to [11] or [12], wherein the curable resin material is a resin material having one or more reactive groups selected from the group consisting of a (meth)acryl group, oxetanyl group, cyclohexene oxide group and vinyl ether group.

[14] The method for manufacturing a magnetic recording medium according to any one of [11] to [13], wherein the curable resin material is a radiation-curable resin material that exhibits curability relative to radiation having a wavelength within a range from 300 to 400 nm, and the cured product of the curable resin material is a cured product obtained by curing the curable resin material by irradiation of radiation.

[15] The method for manufacturing a magnetic recording medium according to any one of [11] to [14], wherein the cured resin of the curable resin material exhibits a transmittance of at least 20% for radiation having a wavelength within a range from 300 to 400 nm, and has a tensile elastic modulus at a temperature of 25° C. of not less than 1.3 GPa.

[16] The method for manufacturing a magnetic recording medium according to any one of [11] to [15], wherein during the step of transferring the pattern of protrusions and recesses on the mold to the resist film, the resist film is cured by irradiation with radiation having a wavelength within a range from 300 to 400 nm.

Effect of the Invention

The laminated body for manufacturing a resin mold according to the present invention enables a resin replica mold which has a fine pattern of protrusions and recesses formed thereon to be manufactured with superior precision, in large quantities, and at a high level of productivity.

The method for manufacturing a laminated body for manufacturing a resin mold according to the present invention enables the above laminated body to be manufactured with comparative ease.

The method for manufacturing a resin mold according to the present invention enables a resin replica mold having a fine pattern which has recessed and protruding portions and is formed on the mold to be manufactured with superior precision, in large quantities, and at a high level of productivity. Accordingly, in the manufacture of semiconductors or the like using a nanoimprint method, the mass producibility of the product can be improved, and the manufacturing costs can be reduced.

The method for manufacturing a magnetic recording medium according to the present invention enables a magnetic recording medium that is capable of realizing a high recording density to be manufactured inexpensively and at a high level of productivity.

BEST MODE FOR CARRYING OUT THE INVENTION

The present invention is described below. However, the present invention is not limited by the examples presented below, and various additions, omissions, substitutions, and other modifications (of numbers, amounts, positions and sizes and the like) can be made without departing from the spirit or scope of the present invention.
(First and Second Aspects of the Present Invention)

The first and second aspects of the present invention relate, for example, to a laminated body which is used to form a resin mold, and is supplied to a compression molding process during the manufacture of resin molds by compression molding using a master mold, and to a method for manufacturing such a laminated body. Further, the first and second aspects also relate to a method for manufacturing a resin mold using the above laminated body for manufacturing a resin mold.
(Laminated Body for Forming Resin Mold)

A more detailed description of the present invention is presented below.

First is a description of an example of the laminated body for forming a resin mold according to the present invention (hereinafter abbreviated as "the laminated body").

Figure 1:
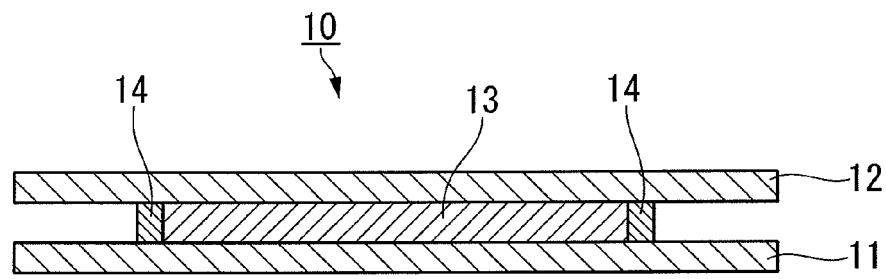
FIG. 1 is a cross-sectional view illustrating one example of a laminated body of the present invention.
Figure 2:
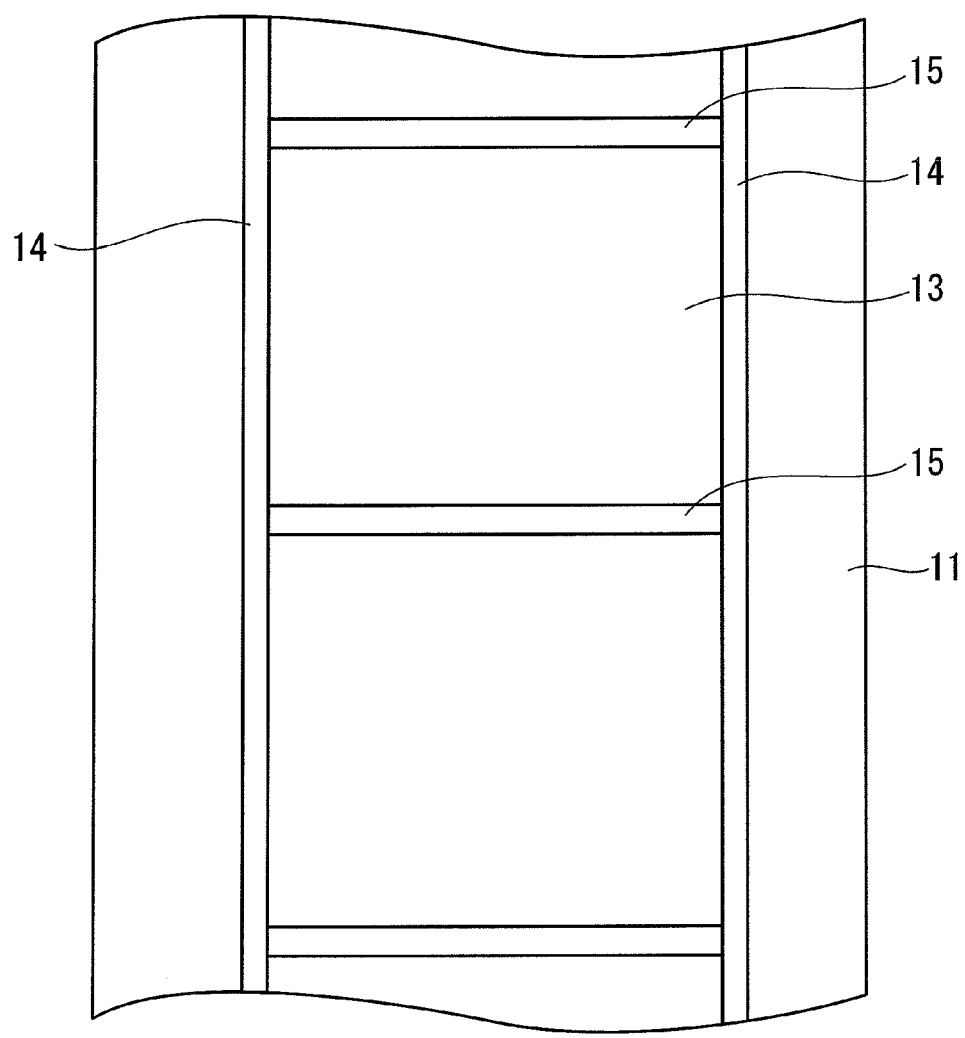
FIG. 2 is a diagram describing one example of the curable resin material layer and the flow suppression bodies.

FIG. 1 illustrates a laminated body of the present embodiment. When a resin replica mold is prepared by compression molding using a master mold, this laminated body 10 is the body subjected to compression molding. Specifically, the laminated body 10 includes a pair of mutually opposing long base materials 11 and 12 (namely, rectangular or substantially rectangular base materials), a curable resin material layer 13 sandwiched between the pair of base materials 11 and 12, and first flow suppression bodies 14, that are sandwiched between, and extend along the lengthwise direction of, the pair of base materials 11 and 12. The curable resin material layer 13 is sealed between the pair of base materials 11 and 12 and the first flow suppression bodies 14. The base material 11 may be referred to as "the base film", and the base material 12 may be referred to as the "cover film."

The base materials 11 and 12 are an elongated shape. Accordingly, the curable resin material layer 13 can also be formed in an elongated shape, meaning the master mold can be stamped in a continuous manner.

There are no particular limitations on the length of the elongated base materials 11 and 12. This length may be selected as required, and for example, may be within a range from 10 m to 20,000 m.

In this example, where the base materials 11 and 12 have an elongated shape, the thickness of the curable resin material layer 13 sandwiched between the base materials may develop unevenness along the lengthwise direction of the laminated body. In order to prevent such unevenness, in this example, a plurality of linear second flow suppression bodies 15 that extend across the width of the laminated body are provided at regular intervals along the laminated body length. By providing these types of second flow suppression bodies 15, the curable resin material is inhibited from moving along the lengthwise direction, thereby preventing the thickness of the curable resin material layer 13 from developing unevenness along the lengthwise direction of the laminated body. The shape of the flow suppression bodies 15 may be selected as required. In those cases where the second flow suppression bodies 15 are provided, the curable resin material layer 13 can be formed in a selected shape, for example in the shape of a square, a rectangle, or a circle.

There are no particular limitations on the materials used for the base materials 11 and 12, which may be selected appropriately in accordance with the intended purpose. In those cases where a photocurable resin is used as the curable resin material, materials capable of transmitting the radiation used for curing the photocurable resin are preferred as the base materials. Moreover, in order to ensure a uniform thickness for the curable resin material layer 13, materials having a favorable level of surface smoothness are particularly preferable.

Specific examples of the material for the base materials 11 and 12 include transparent synthetic resins, such as plastic films of polyethylene terephthalate, polyethylene naphthalate, polypropylene, polyethylene, cellulose triacetate, cellulose diacetate, poly(alkyl(meth)acrylate), poly(meth)acrylate copolymers, polyvinyl chloride, polyvinyl alcohol, polycarbonate, polystyrene, cellophane, polyvinylidene chloride copolymers, polyamide, polyimide, vinyl chloride-vinyl acetate copolymers, polytetrafluoroethylene, polytrifluoroethylene, cellulose-based films, and nylon films. Of these, polyethylene terephthalate is preferable. These materials may be used individually, or in combinations of two or more materials.

Further, at least one of the base materials 11 and 12 is preferably composed of a material that can be detached from the cured product of the curable resin material. Specific examples include release-treated films manufactured by Toyobo Co., Ltd., such as E7002, E7006, E7007, K1504, K1571, TN100 and TN200.

When manufacturing a replica resin mold using the laminated body 10, as described below, at least one of the base materials 11 and 12 must be detached. Consequently, provided at least one of the base materials 11 and 12 is formed from a material that is detachable from the cured product of the curable resin material, the workability associated with detaching the base material 11 or 12 can be improved.

However, if the base materials 11 and 12 undergo detachment too readily, then there is a possibility that detachment may result in leakage of the curable resin material sandwiched between the base materials 11 and 12. Accordingly, the detachability of the base materials 11 and 12 is preferably of a level that prevents leakage of the curable resin material.

Furthermore, in order to prevent deformation under the heating applied during the compression molding, the base materials 11 and 12 are preferably composed of a thermoplastic resin or thermosetting resin having a glass transition temperature (Tg) that is higher than the heating temperature used during compression molding.

If necessary, a separation film that acts as a release film may be provided on the surfaces of the base materials 11 and 12 that contact the curable resin material layer 13. This type of separation film may be provided on either one or both of the base materials. As described above, the base materials 11 and 12 are preferably formed using a material that is detachable from the cured product of the curable resin material. On the other hand, the base material 11 used as the base film requires a high degree of rigidity in order to maintain the flatness of the curable resin material layer 13, whereas the base material 12 used as the cover film requires a high degree of flexibility in order to facilitate detachment. With regard to these requirements, if a separation film is provided on the surfaces of the base materials 11 and 12 that contact the curable resin material layer 13 in order to ensure favorable detachability relative to the cured product of the curable resin material, then materials of high rigidity or high flexibility can be selected as the base materials 11 and 12 as required. Accordingly, the above requirements can be satisfied with comparative ease.

The separation film may also be selected based on the bonding properties relative to the base materials 11 and 12. Examples of the separation film include paper, polyethylene and polypropylene-laminated paper, and of these, a polyethylene film or polypropylene film is preferred.

There are no particular limitations on the thickness of the separation film, and the thickness may be selected appropriately in accordance with the intended purpose. The thickness is preferably within a range from 5 to 100 µm, more preferably from 8 to 50 µm, and still more preferably from 10 to 30 µm.

In those cases where a separation film is used, the cured product of the curable resin material and the separation film preferably detach more readily than the cured product of the curable resin material and the base materials 11 and 12. The interlayer adhesive strength between the separation film and the cured product of the curable resin material is preferably smaller than the adhesive strength of any of the other interlayer interfaces within the laminated body.

Examples of combinations of the base materials 11 and 12 and the separation film (shown below as base material/separation film combinations) include polyethylene terephthalate/polypropylene, polyethylene terephthalate/polyethylene, polyvinyl chloride/cellophane, polyimide/polypropylene, and polyethylene terephthalate/polyethylene terephthalate.

Furthermore, at least one of the base materials and the separation films may be subjected to a surface treatment to adjust the adhesive strength. Examples of the surface treatment include application of an undercoat layer, corona discharge treatment, flame treatment, ultraviolet irradiation treatment, high-frequency irradiation treatment, glow discharge treatment, active plasma irradiation treatment, and laser light irradiation treatment.

Of these, examples of methods of applying an undercoat include methods in which a coating liquid containing a polymer such as a polyorganosiloxane, fluorinated polyolefin, polyfluoroethylene, or polyvinyl alcohol is applied to the surface of the base material or separation film, and is then dried for 1 to 30 minutes at a temperature of 30 to 150° C. (and preferably 50 to 120° C.) to form an undercoat layer.

The coefficient of static friction between the base material and the separation film is preferably within a range from 0.3 to 1.4, and more preferably from 0.5 to 1.2. If the coefficient of static friction is less than 0.3, then the interface is too slippery, meaning winding misalignment may occur when the laminated body is wound into a roll, whereas if the coefficient of static friction exceeds 1.4, then winding the laminated body into a roll form may become problematic.

There are no particular limitations on the thickness of the base materials 11 and 12, and the thickness may be selected appropriately in accordance with the intended purpose. For example, the thickness is preferably within a range from 2 to 300 µm, preferably from 5 to 200 µm, and still more preferably from 8 to 100 µm.

The curable resin material is a material that has liquid-like or gel-like fluidity. In terms of enabling manufacture of the resin mold with a higher level of precision, the viscosity of the curable resin material is preferably not more than 10 Pa·s, and more preferably within a range from 0.01 to 3 Pa·s. In this description, the viscosity describes the value measured in an environment at 25° C., for example using a viscometer (such as the product "DV-E Viscometer" manufactured by Brookfield Engineering Laboratories, Inc.).

As the curable resin material, a resin material having one or more reactive groups selected from the group consisting of a (meth)acryl group, oxetanyl group, cyclohexene oxide group and vinyl ether group is preferred, as such materials exhibit superior curability.

In those cases where the laminated body 10 is to be used in a photo nanoimprint method, a radiation-curable resin material is used as the curable resin material, whereas in those cases where the laminated body 10 is used in a thermal nanoimprint method, a thermoplastic resin or heat-curable resin is used as the curable resin material.

A radiation-curable resin material is particularly preferred as the curable resin material. A radiation-curable resin material can be cured quickly and easily by irradiation of rays, and therefore the process of manufacturing replica molds from a master mold can be performed easily and quickly.

The radiation-curable resin material preferably includes a resin that exhibits curability relative to radiation having a wavelength within a range from 300 to 400 nm. Further, following curing, the cured product preferably exhibits a transmittance of at least 20% for radiation having a wavelength within a range from 300 to 400 nm, and preferably has a tensile elastic modulus at a temperature of 25° C. of not less than 1.3 GPa.

By using this type of radiation-curable resin, because the cured product of the curable resin material exhibits satisfactory transmittance of light, a photo nanoimprint method can be used for the nanoimprint process. Further, provided the tensile elastic modulus of the cured product of the curable resin material is at least 1.3 GPa, a resin mold having physical properties that are suited to a nanoimprint method can be obtained.

Further, this type of radiation-curable curable resin material suffers minimal shrinkage upon photocuring and exhibits excellent releasability from the master mold, and therefore by producing replica molds using this resin material, resin molds having a very fine pattern of protrusions and recesses formed thereon can be manufactured with a low defect rate.

The transmittance of a particular wavelength is measured, for example, using a spectrophotometer (such as the product "V-650" manufactured by Jasco Corporation). The thickness of the cured film used as the measurement sample is set to 20 µm, and the measurement temperature is typically room temperature. Furthermore, the tensile elastic modulus is determined in accordance with JIS K7120. Namely, a cured film for evaluation is attached to a rheometer (such as the product "RT-3010D-CW", manufactured by Fudoh Kogyo Co., Ltd.) using a chuck width of 50 mm, and the cured film is then stretched at 25° C. and the displacement at the point of rupture is determined.

The radiation-curable resin material that exhibits curability relative to ultraviolet radiation having a wavelength within a range from 300 to 400 nm is preferably a resin material containing an acrylic monomer (A), a photopolymerization initiator (B) and a release agent (C).

There are no particular limitations on the acrylic monomer (A), which may be selected appropriately in accordance with the intended purpose. Examples include (meth)acrylate esters, and (meth)acrylamides. In this description, the terms "(meth)acrylate" is generic terms that include acrylate and methacrylate, and acrylamide.

Specific examples of the (meth)acrylate esters include mono(meth)acrylates such as phenoxyethyl(meth)acrylate, benzyl(meth)acrylate, stearyl(meth)acrylate, lauryl(meth)acrylate, 2-ethylhexyl(meth)acrylate, ethoxyethyl(meth)acrylate, methoxyethyl(meth)acrylate, glycidyl(meth)acrylate, tetrahydrofurfuryl(meth)acrylate, allyl(meth)acrylate, 2-hydroxyethyl(meth)acrylate, 2-hydroxypropyl(meth)acrylate, N,N-diethylamino ethyl(meth)acrylate, N,N-dimethylaminoethyl(meth)acrylate and dimethylaminoethyl(meth)acrylate, di(meth)acrylates such as 1,3-butanediol di(meth)acrylate, 1,4-butanediol di(meth)acrylate, 1,6-hexanediol di(meth)acrylate, diethylene glycol di(meth)acrylate, neopentyl glycol di(meth)acrylate, polyoxyethylene glycol di(meth)acrylate and tripropylene glycol di(meth)acrylate, tri(meth)acrylates such as trimethylolpropane tri(meth)acrylate and pentaerythritol tri(meth)acrylate, and other (meth)acrylates such as dipentaerythritol hexa(meth)acrylate.

Specific examples of the (meth)acrylamides include (meth)acrylamide, N-methyl(meth)acrylamide, N-ethyl(meth)acrylamide, N-propyl(meth)acrylamide, N-isopropyl(meth)acrylamide, N-n-butyl(meth)acrylamide, N-t-butyl(meth)acrylamide, N-cyclohexyl(meth)acrylamide, N-(2-methoxyethyl) (meth)acrylamide, N,N-dimethyl(meth)acrylamide, N,N-diethyl(meth)acrylamide, N-phenyl(meth)acrylamide, N-benzyl(meth)acrylamide, (meth)acryloylmorpholine and diacetone acrylamide. One specific example of a commercially available product is BEAMSET 371 (manufactured by Arakawa Chemical Industries, Ltd.).

Any of these acrylic monomers may be used individually, or two or more monomers may be used in combination.

The amount of the acrylic monomer within the radiation-curable resin material is preferably within a range from 85 to 98% by mass, more preferably from 87.5 to 96% by mass, and still more preferably from 90 to 94% by mass. Provided the amount of the acrylic monomer is at least 85% by mass, satisfactory physical properties can be achieved in those cases where the cured material is subjected to molding. Provided the amount is not more than 98% by mass, mixing with the polymerization initiator and release agent and the like enables the physical properties of the cured material to be readily adjusted.

Examples of the photopolymerization initiator (B) include acetophenone-based photopolymerization initiators, benzoin-based photopolymerization initiators, benzophenone-based photopolymerization initiators and thioxanthone-based photopolymerization initiators. Specific examples of these initiators include the compounds listed below.

Acetophenone-based photopolymerization initiators such as acetophenone, p-(tert-butyl)-1',1',1'-trichloroacetophenone, chloroacetophenone, 2',2'-diethoxyacetophenone, hydroxyacetophenone, 2,2-dimethoxy-2'-phenylacetophenone, 2-aminoacetophenone and dialkylaminoacetophenones.

Benzoin-based photopolymerization initiators such as benzil, benzoin, benzoin methyl ether, benzoin ethyl ether, benzoin isopropyl ether, benzoin isobutyl ether, 1-hydroxycyclohexyl phenyl ketone, 2-hydroxy-2-methyl-1-phenyl-2-methylpropan-1-one, 1-(4-isopropylphenyl)-2-hydroxy-2-methylpropan-1-one and benzyl dimethyl ketal.

Benzophenone-based photopolymerization initiators such as benzophenone, benzoylbenzoic acid, methyl benzoylbenzoate, methyl-o-benzoylbenzoate, 4-phenylbenzophenone, hydroxybenzophenone, hydroxypropylbenzophenone, acrylbenzophenone and 4,4'-bis(dimethylamino)benzophenone.

Thioxanthone-based photopolymerization initiators such as thioxanthone, 2-chlorothioxanthone, 2-methylthioxanthone, diethylthioxanthone and dimethylthioxanthone.

Other photopolymerization initiators such as α-acyloxime ester, benzyl-(o-ethoxycarbonyl)-α-monooxime, acylphosphine oxide, glyoxy esters, 3-ketocoumarin, 2-ethylanthraquinone, camphorquinone, tetramethylthiuram sulfide, azobisisobutyronitrile, benzoyl peroxide, dialkyl peroxides and tert-butyl peroxypivalate.

The amount of the photopolymerization initiator within the radiation-curable resin material is preferably within a range from 0.001 to 10 parts by mass, more preferably from 0.01 to 10 parts by mass, and still more preferably from 0.1 to 5 parts by mass, per 100 parts by mass of the acrylic monomer. Provided the amount of the photopolymerization initiator is at least 0.001 parts by mass, the acrylic monomer can be polymerized in a relatively short period of time, whereas provided the amount is not more than 10 parts by mass, residues of the photopolymerization initiator are unlikely to be retained within the cured product.

In terms of obtaining a cured product with superior releasability, the release agent (C) preferably includes a fluorine-containing surfactant. Moreover, a fluorine-containing surfactant having a fluorine content of 10 to 70% by mass is more preferable, and a fluorine-containing surfactant having a fluorine content of 10 to 40% by mass is particularly desirable. The fluorine-containing surfactant may be water-soluble or oil-soluble.

The fluorine-containing surfactant may be any of an anionic fluorine-containing surfactant, cationic fluorine-containing surfactant, amphoteric fluorine-containing surfactant and nonionic fluorine-containing surfactant. Of these, a nonionic fluorine-containing surfactant is particularly desirable in terms of achieving favorable compatibility with the curable resin material and favorable dispersibility of the surfactant within the cured product.

The anionic fluorine-containing surfactant is preferably a polyfluoroalkyl carboxylate, polyfluoroalkyl phosphate ester or polyfluoroalkyl sulfonate. Specific examples of the cationic surfactant include SURFLON S-111 (a product name, manufactured by AGC Seimi Chemical Co., Ltd.), FLUORAD FC-143 (a product name, manufactured by 3M Corporation), and MEGAFAC F-120 AND MEGAFAC R-30 (product names, manufactured by DIC Corporation).

The cationic fluorine-containing surfactant is preferably a trimethylammonium salt of a polyfluoroalkylcarboxylic acid or a trimethylammonium salt of a polyfluoroalkylsulfonic acid amide. Specific examples of the cationic fluorine-containing surfactant include SURFLON S-121 (a product name, manufactured by AGC Seimi Chemical Co., Ltd.), FLUORAD FC-134 (a product name, manufactured by 3M Corporation), and MEGAFAC F-150 (a product name, manufactured by DIC Corporation).

The amphoteric fluorine-containing surfactant is preferably a polyfluoroalkyl betaine. Specific examples of the amphoteric fluorine-containing surfactant include SURFLON S-132 (a product name, manufactured by AGC Seimi Chemical Co., Ltd.), FLUORAD FX-172 (a product name, manufactured by 3M Corporation), and MEGAFAC F-120 (a product name, manufactured by DIC Corporation).

The nonionic fluorine-containing surfactant is preferably a polyfluoroalkylamine oxide, or a polyfluoroalkyl-alkylene oxide adduct. Specific examples of the nonionic fluorine-containing surfactant include SURFLON S-145 (a product name, manufactured by AGC Seimi Chemical Co., Ltd.), SURFLON S-393 (a product name, manufactured by AGC Seimi Chemical Co., Ltd.), SURFLON KH-20 (a product name, manufactured by AGC Seimi Chemical Co., Ltd.), SURFLON KH-40 (a product name, manufactured by AGC Seimi Chemical Co., Ltd.), FLUORAD FC-170 (product name, manufactured by 3M Corporation), FLUORAD FC-430 (product name, manufactured by 3M Corporation), and MEGAFAC F-141 (product name, manufactured by DIC Corporation).

The amount of the fluorine-containing surfactant within the radiation-curable resin material is preferably within a range from 0.01 to 10% by mass, and more preferably from 0.1 to 5% by mass, based on 100% by mass of the entire radiation-curable resin material. Provided the amount of the fluorine-containing surfactant is at least 0.01% by mass, a cured product with excellent releasability can be formed with good reliability, and provided the amount is not more than 10% by mass, the radiation-curable resin material can be prepared with relative ease.

In those cases where a thermosetting resin is used as the curable resin material, from the viewpoint of ensuring favorable applicability to thermal nanoimprint methods, the thermosetting resin preferably has a glass transition temperature (Tg) that is higher than the heating temperature used during compression molding.

There are no particular limitations on the thickness of the curable resin material layer 13, and the thickness may be selected appropriately in accordance with the intended purpose. The thickness is preferably within a range from 1 to 50 μm, more preferably from 3 to 25 μm, and still more preferably from 5 to 15 μm.

The first flow suppression bodies 14 and second flow suppression bodies 15 are preferably composed of a cured product obtained by curing one of the curable resin materials described above. The widths of the first flow suppression bodies 14 themselves and the second flow suppression bodies themselves 15 are preferably within a range from 1 to 20 mm. Provided the widths of the first flow suppression bodies 14 themselves and the second flow suppression bodies 15 themselves are at least 1 mm, the curable resin material can be reliably sealed, and provided the widths are not more than 20 mm, a large surface area of uncured curable resin material can be retained.

In the laminated body 10 described above, because the curable resin material layer 13 is sealed by the base materials 11 and 12, the first flow suppression bodies 14 and the second flow suppression bodies 15, the curable resin material can be prevented from flowing out, meaning the curable resin material layer 13 can be formed with a thin yet uniform thickness. Particularly in those cases where the first flow suppression bodies 14 are formed by partially curing the curable resin material itself, a uniform thickness can be achieved across the entire curable resin material layer 13. Accordingly, when the master mold is pressed against the laminated body, the pattern of the mold can be transferred with high precision, enabling the manufacture of favorable resin replica molds.

Further, by using this type of laminated body 10, the curable resin material layer 13 that acts as the raw material for the manufacture of the replica molds can be easily supplied continuously to the stamper apparatus without the use of large-scale equipment. As a result, resin replica molds which has a fine pattern having recessed and protruding portions formed on the molds can be manufactured in large quantities at a good level of productivity.

(Method for Manufacturing Laminated Body)

One example of a method for manufacturing the laminated body of the present invention is described below.

In the method for manufacturing a laminated body according to this embodiment, first, a curable resin material that has been diluted with a solvent is applied to one base material 11, and following drying to remove the solvent, the other base material 12 is mounted on top of the curable resin material.

Subsequently, only the peripheral portions of the curable resin material sandwiched between the base materials 11 and 12 are cured using a preferred method, thereby forming the first flow suppression bodies 14 along both sides of the laminated body. There are no particular limitations on the method used for forming the first flow suppression bodies 14, and the method may be selected appropriately in accordance with the properties of the curable resin material. For example, following mounting of the other base material 12 on top of the curable resin material, but prior to winding the laminated body into a roll, ultraviolet irradiation may be used to continuously cure only those portions positioned at the edges of the curable resin material in the widthwise direction, thus forming the first flow suppression bodies 14. By employing this method, continuous manufacture becomes more efficient, and the productivity can be improved.

Subsequently, the ultraviolet light is irradiated across the widthwise direction to form the second flow suppression bodies 15. By forming the second flow suppression bodies 15, the thickness of the sealed curable resin material can be maintained at a more uniform thickness.

There are no particular limitations on the method used for forming the second flow suppression bodies 15. Possible methods include a method in which the ON-OFF switching of the ultraviolet irradiation device is controlled with a timer, so that at a certain fixed interval, ultraviolet light is irradiated across the resin material to form the second flow suppression bodies 15 with a fixed distance therebetween, and a method in which a shutter is used to enable the ultraviolet light to be irradiated across the widthwise direction of the resin material at a fixed interval, thereby forming the second flow suppression bodies 15 with a fixed distance therebetween.

By forming the first flow suppression bodies 14 and the second flow suppression bodies 15 in the manner described above, the first flow suppression bodies are linked together by the second flow suppression bodies, thereby sealing the curable resin material layer 13. If required, the laminated body may then be wound into a roll to form a roll of the laminated body 10.

In the above-mentioned method for manufacturing the laminated body 10, because selected peripheral portions of the curable resin material sandwiched between the base materials 11 and 12 are cured to form the first flow suppression bodies 14 and the second flow suppression bodies 15, the laminated body 10 can be manufactured with relative ease.

Figure 3:
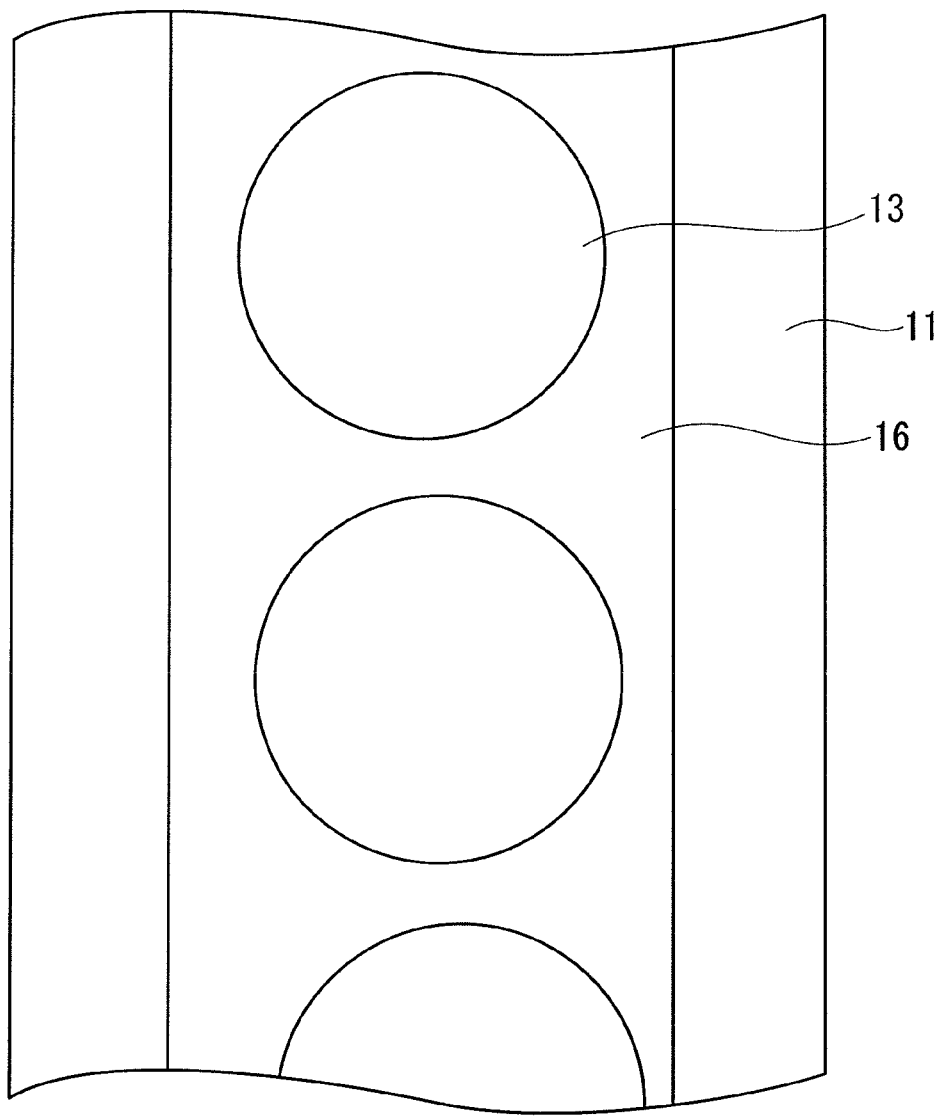
FIG. 3 is a diagram describing another example of the curable resin material layer and the flow suppression bodies.

The laminated body according to the present invention and the method for manufacturing the laminated body are not limited to the example described above. For example, the numbers, shapes and positions of the flow suppression bodies may be selected as desired. In the above example, the flow suppression bodies were composed of the first flow suppression bodies 14 that extend along the lengthwise direction of the laminated body and the second flow suppression bodies 15 that extend across the widthwise direction, but as illustrated in FIG. 3, the curable resin material layer 13 may be formed as circular shapes, with the remaining portion 16 cured to form a flow suppression body.

(Resin Mold)

An example of a method for manufacturing the resin mold according to the present invention is described below.

Figure 4:
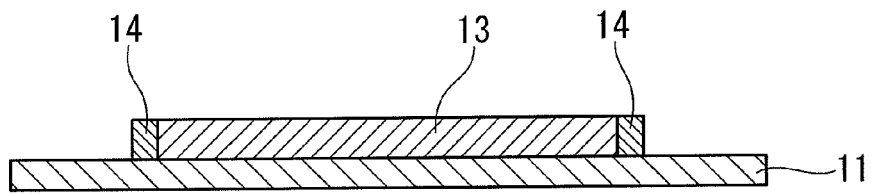
FIG. 4 is a diagram illustrating one step in an example of the method for manufacturing a resin mold according to the present invention.

In the method for manufacturing a resin mold according to this embodiment, first, as illustrated in FIG. 4, one base material 12 is detached from the laminated body 10 described above, thereby exposing the curable resin material layer.

Figure 5:
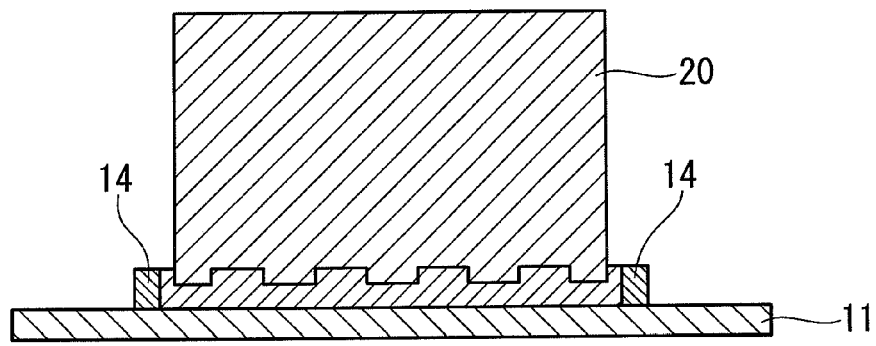
FIG. 5 is a diagram illustrating one step in an example of the method for manufacturing a resin mold according to the present invention.

Subsequently, as illustrated in FIG. 5, a master mold 20 having a pattern of protrusions and recesses formed thereon is pressed against the exposed curable resin material layer 13.

The pressure during this process may be selected as required, and is preferably within a range from 0.1 to 100 MPa. Provided the pressure is at least 0.1 MPa, the pattern of the master mold 20 can be transferred with a high degree of precision, and provided the pressure is not more than 100 MPa, a general-purpose apparatus can be used as the stamper apparatus.

Next, the curable resin material layer 13 is cured with the master mold 20 still pressed against the layer, thereby yielding a resin mold 30.

In those cases where the curable resin material is a radiation-curable resin material, the curing is performed by irradiating radiation such as ultraviolet light or an electron beam onto the curable resin material layer 13. At this time, the irradiation intensity is preferably within a range from 20 to 10,000 mW/cm$^2$. Provided the irradiation intensity is at least 20 mW/cm$^2$, curing can be performed rapidly. However, increasing the irradiation intensity beyond 10,000 mW/cm$^2$ yields no further increase in the curing rate, and is therefore unnecessary.

In those cases where the curable resin material is a heat-curable resin, the material is heated at a temperature that is higher than the curing temperature of the heat-curable resin.

Figure 6:
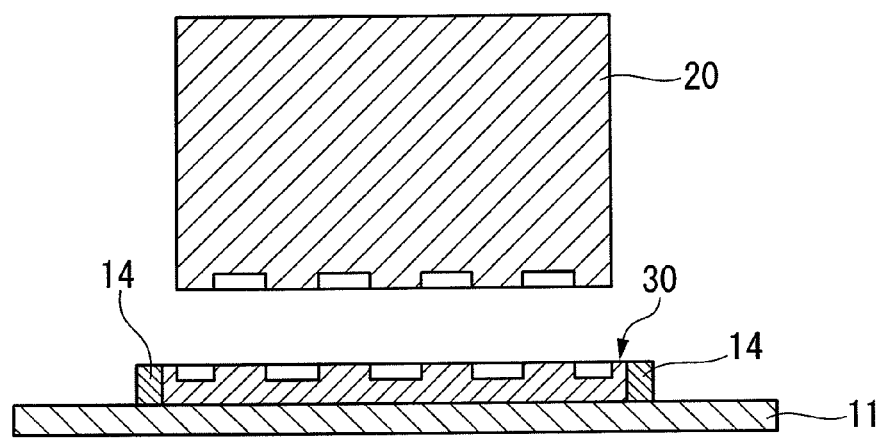
FIG. 6 is a diagram illustrating one step in an example of the method for manufacturing a resin mold according to the present invention.

Subsequently, as illustrated in FIG. 6, the resin mold 30 is detached from the master mold 20, and the resin mold 30 is recovered. The resin mold 30 obtained using this method is used as a replica mold.

In the method for manufacturing a resin mold according to the present invention, because the laminated body 10 described above is used, resin replica molds which has fine patterns of protrusions and recesses formed thereon can be manufactured with superior precision, in large quantities, and at a high level of productivity.

(Third Aspect)

The third aspect of the present invention relates to a method for manufacturing a magnetic recording medium that can be used in a hard disk device or the like.

The method for manufacturing a magnetic recording medium according to the present invention includes: forming a magnetic layer on one surface of a substrate, forming a resist film on the surface of the magnetic layer, pressing a resin mold which has a pattern of protrusions and recesses formed thereon against the resist film, thereby transferring the pattern on the mold to the resist film, detaching the mold from the resist film, and using the pattern that has been transferred to the resist film to form a magnetic recording pattern on the magnetic layer. This method yields a magnetic recording medium having a magnetically separated magnetic recording pattern.

(Process for Manufacturing Mold)

The mold used in this aspect of the present invention is obtained using the process outlined below.

Namely, the process yields a resin mold, and includes: sandwiching a liquid or gel-like curable resin material between a pair of mutually opposing base materials, and curing only the peripheral portions of the curable resin material to obtain a laminated body having a curable resin material layer, detaching one of the base materials from the laminated body, pressing a master mold having a pattern having recessed and protruding portions formed on the mold against the curable resin material layer, curing the curable resin material layer with the master mold still pressed against the layer, thereby forming a resin mold, and detaching the resin mold from the master mold.

The laminated body and the manufacturing method used in the third aspect may use the laminated body and resin mold of the first and second aspects, any may also use the same materials and conditions, namely, the base materials, curable resin material and flow suppression bodies and the like described above in relation to the first and second aspects. The preferred examples described above for the first and second aspects, including the conditions described for the preferred properties, amounts and sizes and the like, may also be used favorably in the third aspect, and yield favorable effects.

The laminated body of the present invention is not restricted to the specific laminated bodies described above, and a laminated body of any arbitrary shape or size may be used, provided it yields no particular problems. For example, as illustrated in FIG. 3, the curable resin material layer 13 may be formed as circular uncured portions, with the remaining portion 16 cured to form a flow suppression body.

An example of a method for manufacturing resin replica molds using the laminated body described above and a master mold is described below.

Figure 7:
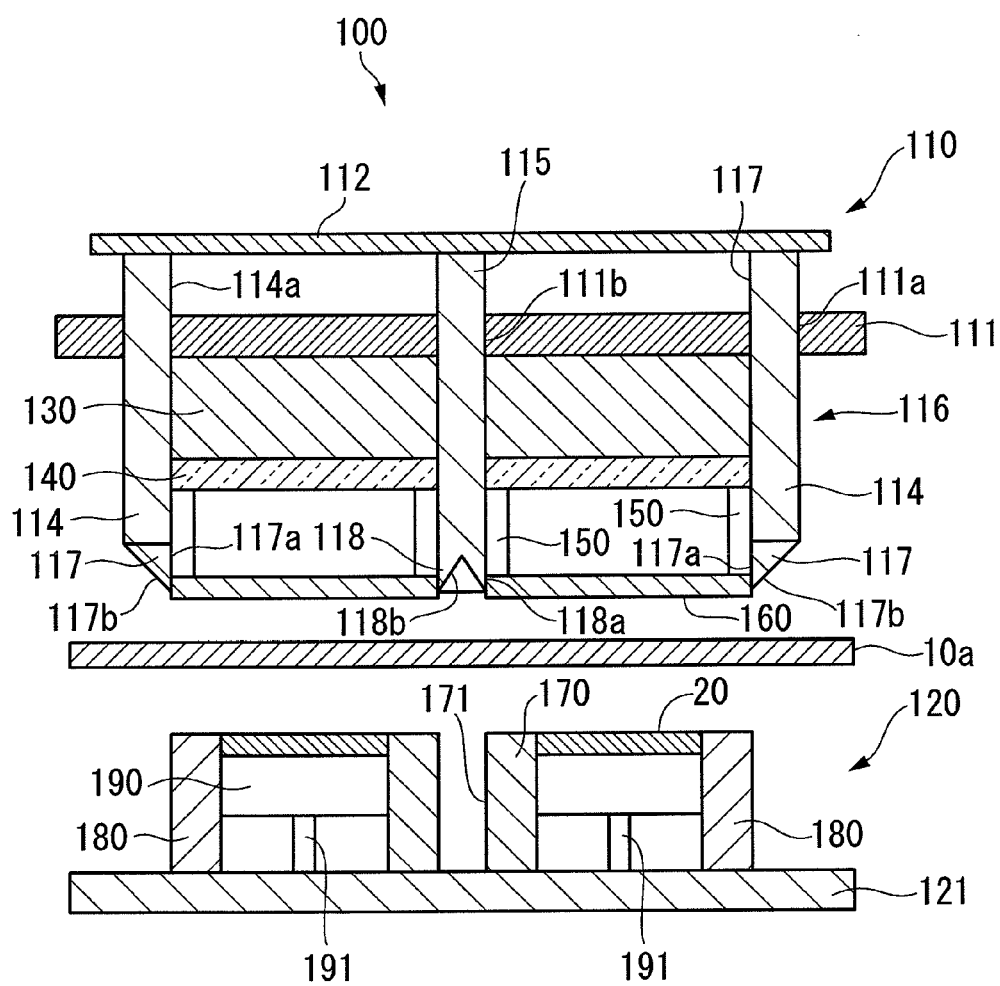
FIG. 7 is a cross-sectional view illustrating one example of an apparatus for manufacturing a resin replica mold.
Figure 8:
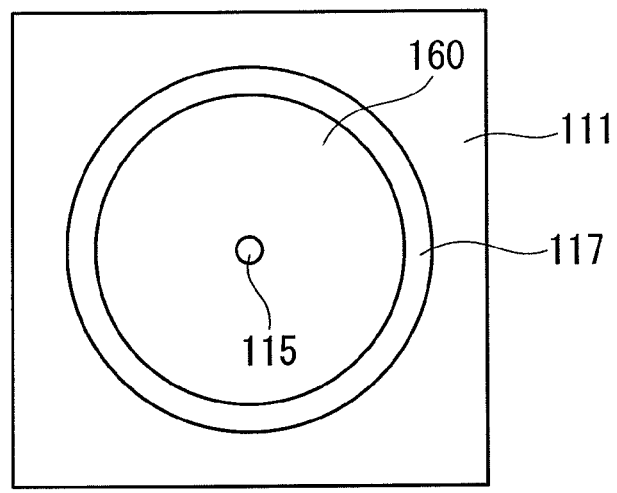
FIG. 8 is a diagram illustrating the bottom surface of the upper set that constitutes the apparatus illustrated in FIG. 7.
Figure 9:
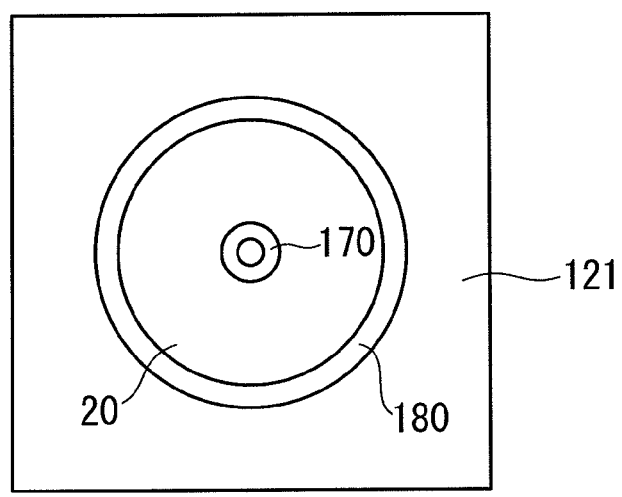
FIG. 9 is a diagram illustrating the top surface of the lower set that constitutes the apparatus illustrated in FIG. 7.

FIG. 7 to FIG. 9 illustrate an apparatus for manufacturing resin molds using a master mold.

This resin mold manufacturing apparatus 100 includes an upper set 110 supported on a first mounting plate 111, and a lower set 120 supported on a second mounting plate 121. The first mounting plate 111 is supported by an actuator for movement in the vertical direction (not shown in the drawing), such as a hydraulic cylinder, and can be moved freely up and down. The second mounting plate 121 is secured to a base not shown in the drawing.

A circular disc-shaped cutter set member 112 is provided above the first mounting plate 111 and is supported by an actuator for movement in the vertical direction, such as a hydraulic cylinder (not shown in the drawing), thereby enabling the cutter set member 112 to be moved freely up and down. A cylindrical outer circumferential cutter portion 114 is provided at the outer periphery on the bottom surface of the cutter set member 112. An inner circumferential cutter portion 115 having a circular column shape (a round bar shape) is provided at the center of the bottom surface of the cutter set member 112. The outer circumferential cutter portion 114 and the inner circumferential cutter portion 115 constitute a cutter member 116. Further, a ring-shaped outer circumferential cutter blade 117 is formed at the tip of the outer circumferential cutter portion 114 in a downward facing configuration, and an inner circumferential cutter blade 118 is formed at the tip of the inner circumferential cutter portion 115.

The outer circumferential cutter portion 114 extends beneath the first mounting plate 111 through an aperture 111a formed in the outer circumferential portion of the first mounting plate 111. The inner circumferential cutter portion 115 extends beneath the first mounting plate 111 through an aperture 111b formed in the center of the first mounting plate 111. When the cutter set member 112 is moved in the vertical direction relative to the first mounting plate 111, the outer circumferential cutter portion 114 and the inner circumferential cutter portion 115 are moved in the vertical direction.

The outer circumferential cutter blade 117 is formed with a triangular cross-sectional shape. The outer circumferential cutter blade 117 includes a cutting surface 117a that extends from an inner circumferential surface 114a of the cylindrical outer circumferential cutter portion 114, and an outside cutting surface 117b that is inclined toward the outside surface of the outer circumferential cutter portion 114. The inner circumferential cutter blade 118 includes a cutting surface 118a that extends from an outer circumferential surface of the circular column-shaped inner circumferential cutter portion 115, and a downward-facing mortar-shaped concave portion 118b (cone-shaped concave portion) with an inverted-V shape cross-section that is positioned at the tip of the inner circumferential cutter portion 115.

Below the first mounting plate 111, a radiation source support mechanism 130 and an irradiation device 140 that emits radiation are provided in an area between the outer circumferential cutter portion 114 and the inner circumferential cutter portion 115. The radiation source housed inside the irradiation device 140, such as a high-pressure mercury lamp, low-pressure mercury lamp, metal halide lamp, xenon lamp, xenon-mercury lamp or ultraviolet LED lamp, is positioned to allow ultraviolet light to be irradiated downward. Of the above radiation sources, the use of an ultraviolet LED lamp is particularly desirable, as it generates minimal heat, which can cause distortions within the molded article. The wavelength of the ultraviolet radiation used is typically within a range from 300 to 400 nm.

A frame-shaped support member 150 is provided below the irradiation device 140, and a radiation-transmitting pressing base 160 such as a circular disc-shaped glass plate that is capable of transmitting the radiation is provided below the support member 150. The radiation source support member 150, the irradiation device 140 and the radiation-transmitting pressing base 160 are formed as an integrated unit together with the first mounting plate 111, and therefore the radiation-transmitting pressing base 160 and the like move up and down in accordance with the vertical movement of the first mounting plate 111.

A circular cylindrical inside sliding support member 170 and a circular cylindrical outside sliding support member 180 having the same height are provided on top of the second mounting plate 121. A circular disc-shaped mount 190 is interposed between the two sliding support members and is able to slide freely in the vertical direction. The mount 190 is supported by an elastic member 191 such as a spring member provided beneath the mount. A doughnut disc-shaped master mold 20 is positioned on top of the mount 190 so as to protrude slightly above the sliding support members 170 and 180. The amount of this protrusion may be selected as required.

The master mold 20 has a pattern that has recessed and protruding portions formed on the upper surface thereof and is to be transferred. In this example, a resin mold for forming a pattern of protrusions and recesses on the surface of a discrete track magnetic recording medium is to be manufactured, and therefore a pattern that is identical to the pattern to be formed on the surface of the discrete track magnetic recording medium is formed on the upper surface of the master mold 20.

A concave portion 171 into which the above-mentioned rod-shaped inner circumferential cutter blade 118 can be inserted is formed in the center of the inside support member 170.

When manufacturing a resin mold using an apparatus of the structure illustrated in FIG. 7, a film-like laminated body 10 described above is prepared as the base for the targeted resin mold.

The base material 12, which is the base material that acts as the cover film, is removed from the laminated body 10, thereby exposing the curable resin material layer 13 (see FIG. 1) (hereinafter, the laminated body from which the base material 12 has been removed is referred to as "the laminated body 10a").

Figure 10:
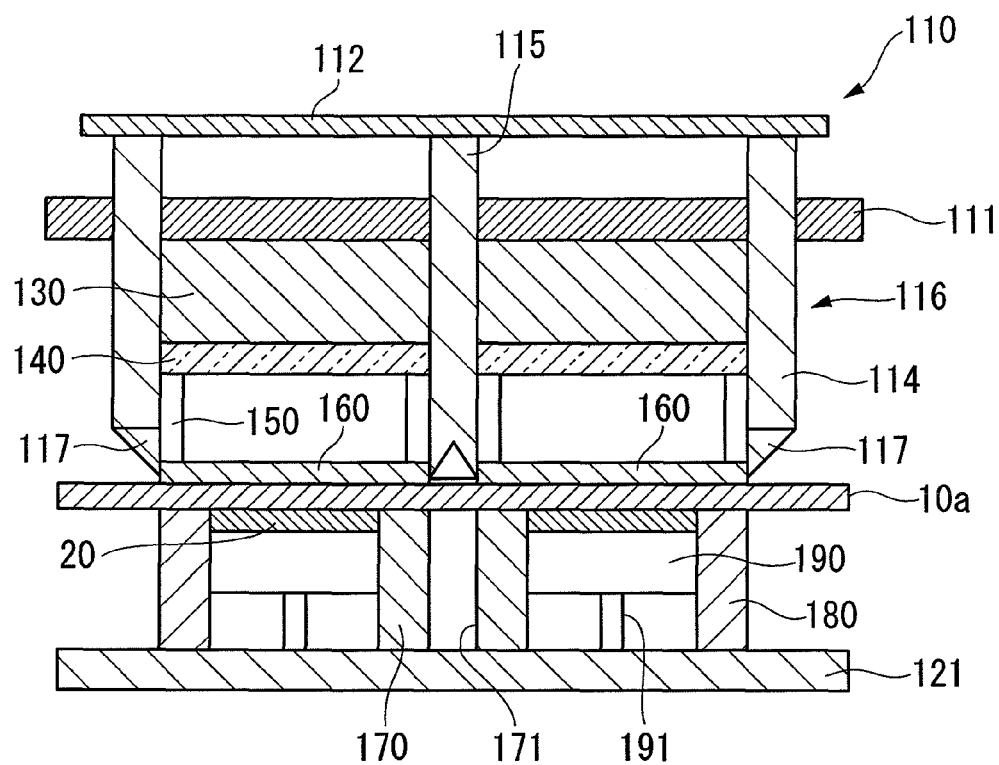
FIG. 10 is a diagram illustrating one step in an example of the method for manufacturing a resin mold.

As illustrated in FIG. 10, the laminated body 10a is sandwiched between the master mold 20 and the radiation-transmitting pressing base 160. Subsequently, the first mounting plate 111 is lowered, and the radiation-transmitting pressing base 160 is used to press the laminated body 10a against the master mold 20 with a prescribed pressure. The master mold 20 may be composed of a metal plate of a material such as a Ni alloy, which is able to be subjected to precision machining, and in which a fine pattern of protrusions and recesses can be formed using conventional molding techniques.

By employing this operation, the fine pattern of protrusions and recesses formed on the surface of the master mold 20 is transferred, as the inverse pattern of this fine pattern, to the curable resin material layer 13 of the laminated body 10a (the process up until this point is referred to as the "transfer step"). In other words, grooves within the master mold 20 are transferred to the curable resin material layer 13 as lands, and lands are transferred as grooves.

Subsequently, with the laminated body 10a still pressed against the surface of the master mold 20, ultraviolet radiation is irradiated from the irradiation device 140, thereby curing the curable resin material (this process is referred to as the "curing step").

Figure 11:
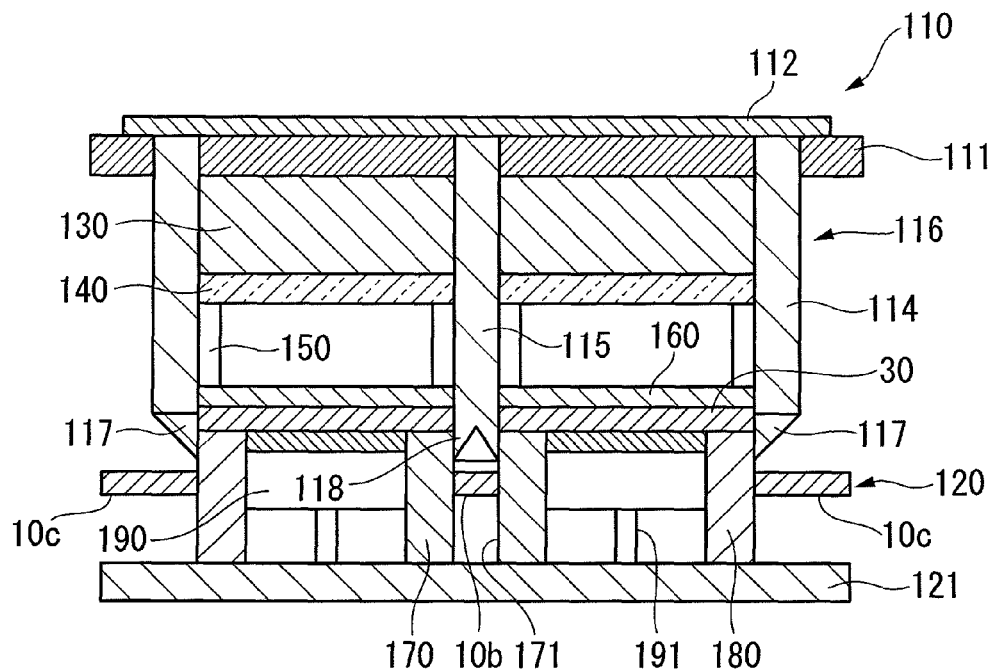
FIG. 11 is a diagram illustrating one step in an example of the method for manufacturing a resin mold.

As illustrated in FIG. 11, before or after the curing, or during the curing, the outer circumferential cutter portion 114 and the inner circumferential cutter portion 115 are lowered by lowering the cutter set member 112, thereby punching out a circular disc-shaped resin mold 30 from the laminated body 10a with the outer circumferential cutter blade 117 and the inner circumferential cutter blade 118 (this process is referred to as the "punching step").

At the time of the punching, the outer circumferential cutter blade 117 slides along the extended outer circumferential surface of the cylindrical outside sliding support member 180 while punching through the laminated body 10a, whereas the inner circumferential cutter blade 118 slides along the inside of the inside sliding support member 170 while punching through the laminated body 10a. This method enables the laminated body 10a to be punched out at a precise location, yielding a doughnut disc-shaped mold 30 with the targeted inner diameter and outer diameter dimensions.

Furthermore, as illustrated in FIG. 11, of the residual portions of the laminated body 10a following punching out of the resin mold 30, a central portion 10b of the laminated body 10a punched out by the inner circumferential cutter blade 118 is discharged into a central recessed portion 171 of the inside sliding support member 170, and an outer peripheral portion 10c of the laminated body 10a punched out by the outer circumferential cutter blade 117 is discharged to a position outside the outside sliding support member 180. The inner diameter of the recessed portion 171 within the inside sliding support member 170 is preferably substantially equal to the outer diameter of the inner circumferential cutter blade 118. With such a construction, when punching is performed, the laminated body 10a is able to be punched out along the inner circumferential edge of the recessed portion 171, with no strain and at a precise position, using the inner circumferential cutter blade 118, meaning the precision of the punching process can be improved. Further, the outer diameter of the outside sliding support member 180 is preferably substantially equal to the inner diameter of the outer circumferential cutter blade 117. With such a construction, when punching is performed, the laminated body 10a is able to be punched out along the outer circumferential edge of the outside sliding support member 180, with no strain and at a precise position, using the outer circumferential cutter blade 117, meaning the precision of the punching process can be improved. In this manner, it is possible to punch out the laminated body 10a into the targeted doughnut disc shape, having an inner circumference of precise shape and position, and an outer circumference of precise shape and position.

In the above manufacturing method, in those cases where the resin mold is formed as a long structure with a plurality of identical patterns provided in a continuous manner along the mold, the punching process using the cutter blades may be performed so that only the inner circumference is punched out, with the outer circumference not being punched.

Figure 12:
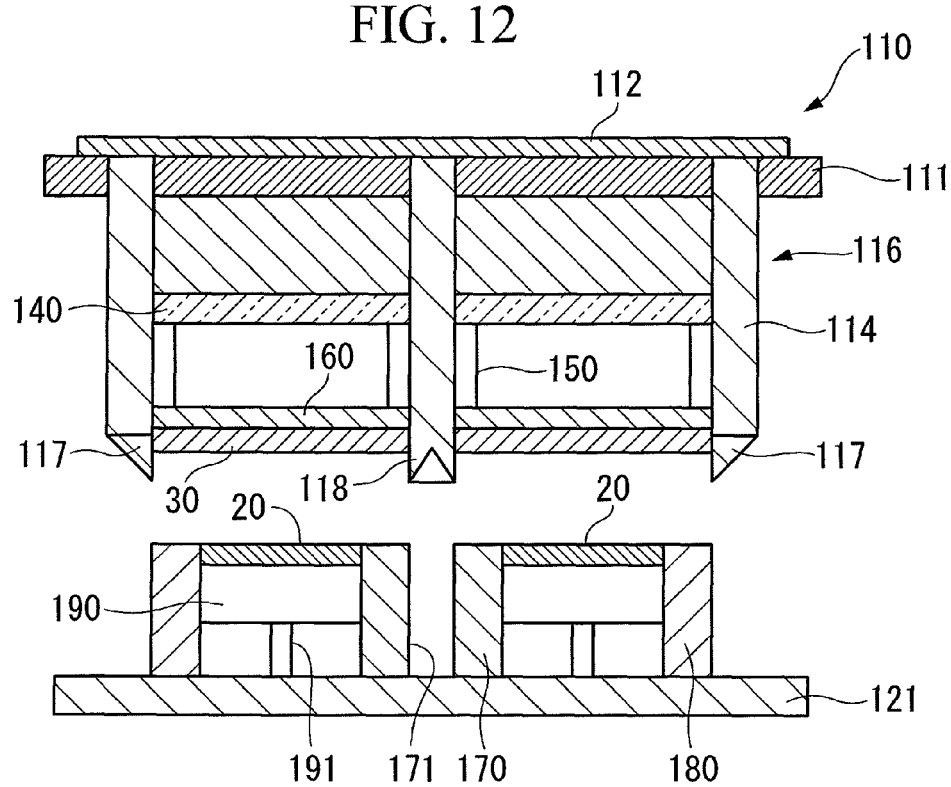
FIG. 12 is a diagram illustrating one step in an example of the method for manufacturing a resin mold.
Figure 13:
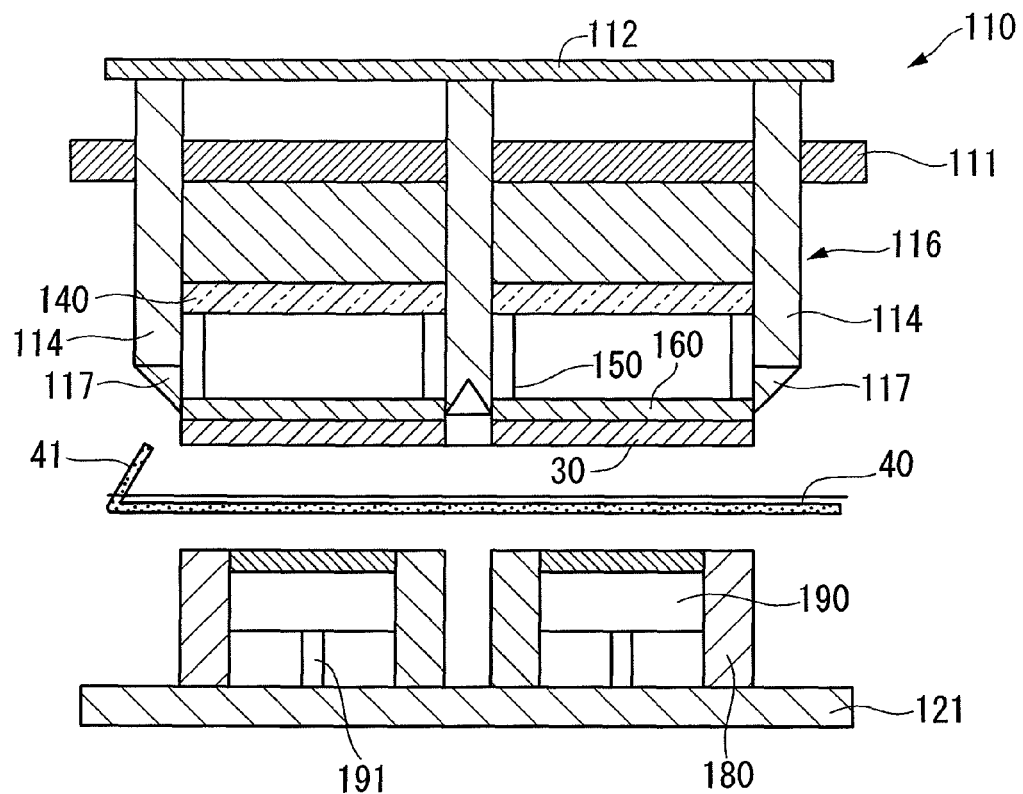
FIG. 13 is a diagram illustrating one step in an example of the method for manufacturing a resin mold.

After the laminated body 10a is punched out as illustrated in FIG. 11, the first mounting plate 111 and the cutter set member 112 are raised up, as illustrated in FIG. 12. At this time, the resin mold 30 is lifted up in a state sandwiched between the outer circumferential cutter blade 117 and the inner circumferential cutter blade 118. Subsequently, as illustrated in FIG. 13, the cutter set member 112 may be moved upward relative to the first mounting plate 111 so that the outer circumferential cutter blade 117 and the inner circumferential cutter blade 118 are removed from the mold 30. In addition, a detachment device such as a takeoff rod 40 having a bent portion 41 at the tip thereof may be used to remove the resin mold 30, which is adhered closely to the radiation-transmitting pressing base 160.

During this removal operation, because the outer circumferential cutter blade 117 and the inner circumferential cutter blade 118 have been removed from the mold 30 in advance, meaning the mold 30 is adhered closely to only the radiation-transmitting pressing base 160, the resin 30 can be removed easily using the takeoff rod 40.

Figure 14:
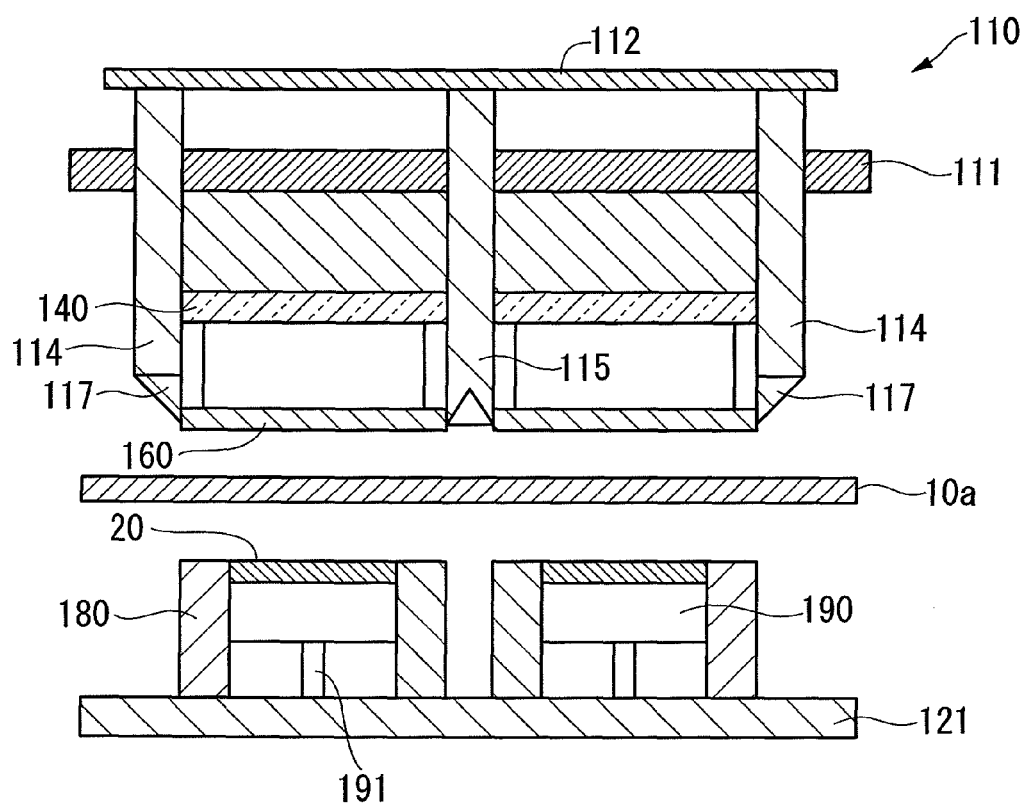
FIG. 14 is a diagram illustrating one step in an example of the method for manufacturing a resin mold.

After the mold 30 is removed from the radiation-transmitting pressing base 160, a new laminated body 10a is positioned between the radiation-transmitting pressing base 160 and the master mold 20, as illustrated in FIG. 14. The pressing step, the ultraviolet irradiation step, and the punching step described above are then repeated to obtain a new mold 30. Accordingly, the molds 30 can be mass-produced by repeating the operations described above.

(Method for Manufacturing Magnetic Recording Medium)

The method for manufacturing a magnetic recording medium according to the present invention can be applied, for example, to the manufacture of a discrete track magnetic recording medium or patterned media. An example of this type of magnetic recording medium is a medium in which a magnetic layer and a protective layer are formed on a non-magnetic substrate.

For example, the magnetic layer formed on the surface of the non-magnetic layer may be an in-plane magnetic layer or a vertical magnetic layer. The magnetic layer is preferably formed form an alloy containing Co as a main component.

For example, a laminated structure including a non-magnetic CrMo base layer and a CoCrPtTa ferromagnetic layer may be used as the magnetic layer of an in-plane magnetic recording medium.

Examples of the magnetic layer of a vertical magnetic recording medium include laminated structures including a backing layer made of a soft magnetic material such as a FeCo alloy (such as FeCoB, FeCoSiB, FeCoZr, FeCoZrB or FeCoZrBCu), an FeTa alloy (such as FeTaN or FeTaC) or a Co alloy (such as CoTaZr, CoZrNB or CoB), an alignment control film made of Pt, Pd, NiCr or NiFeCr or the like, an optional intermediate film made of Ru or the like, and a magnetic layer composed of a 60Co-15Cr-15Pt alloy or a 70Co-5Cr-15Pt-10SiO$_2$ alloy or the like.

The thickness of the magnetic layer may be selected as required, but is typically not less than 3 nm and not more than 20 nm, and is preferably not less than 5 nm and not more than 15 nm. The magnetic layer is preferably formed in accordance with the type of magnetic alloy used and the laminated structure, so as to achieve a satisfactory head output. The thickness of the magnetic layer must exceed a certain thickness in order to achieve an output of at least a predetermined level during reproduction, although various parameters that indicate the recording and reproduction properties tend to deteriorate as the output increases, and therefore the thickness must be set to an appropriate value. The magnetic layer is usually formed as a thin film using a sputtering method.

In the method for manufacturing a magnetic recording medium according to the present invention, a magnetically separated magnetic recording pattern is formed in the magnetic layer. Prior to the step of forming the magnetic recording pattern, a mask layer is formed by forming a resist film on the surface of the magnetic layer, pressing a resin mold having a pattern, which is formed on the mold and has recessed and protruding portions, against the resist film, thereby transferring the pattern from the mold to the resist film, and then detaching the mold from the resist film.

An example of the method for manufacturing a magnetic recording medium according to the present invention using the above-mentioned mold is described below, although the manufacturing method of the present invention is not limited to the method described below.

The method for manufacturing a magnetic recording medium according to this example includes, for example, the steps described below.

Figure 15:
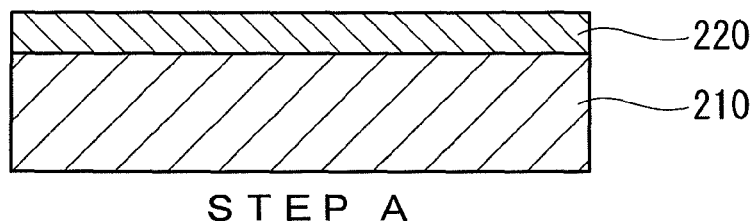
FIG. 15 is a diagram illustrating one step in an example of the method for manufacturing a magnetic recording medium according to the present invention.
Figure 16:
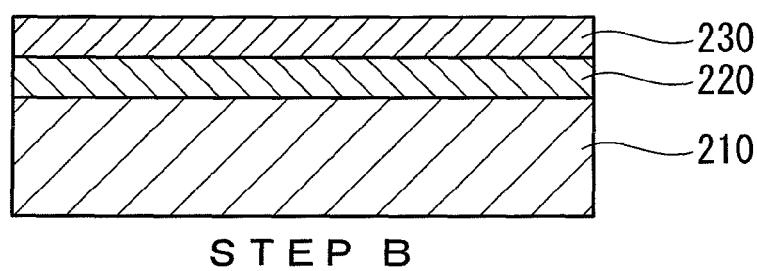
FIG. 16 is a diagram illustrating one step in an example of the method for manufacturing a magnetic recording medium according to the present invention.
Figure 17:
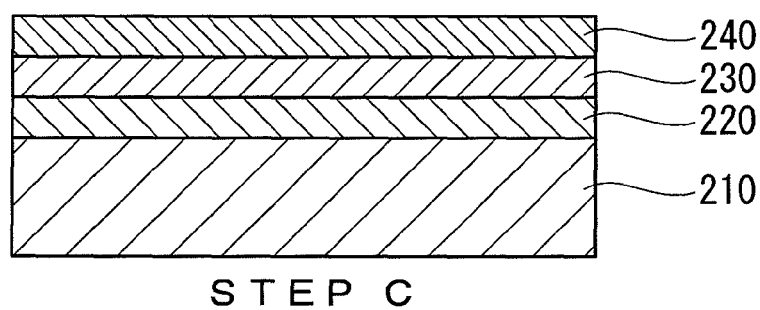
FIG. 17 is a diagram illustrating one step in an example of the method for manufacturing a magnetic recording medium according to the present invention.
Figure 18:
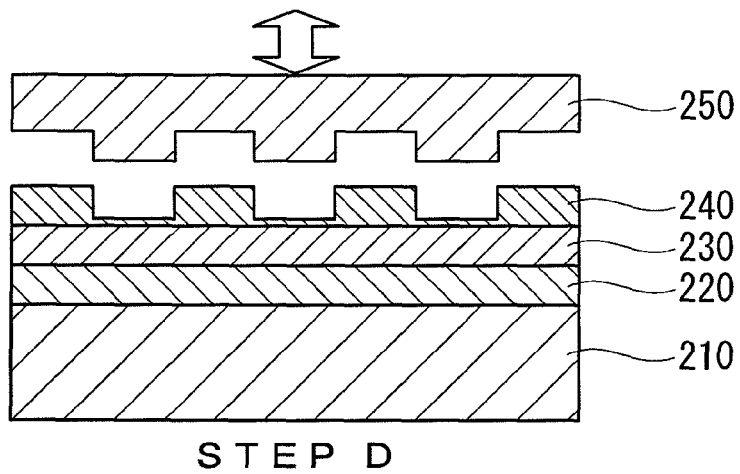
FIG. 18 is a diagram illustrating one step in an example of the method for manufacturing a magnetic recording medium according to the present invention.
Figure 19:
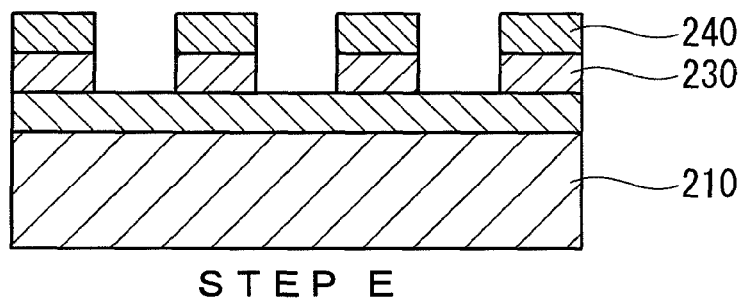
FIG. 19 is a diagram illustrating one step in an example of the method for manufacturing a magnetic recording medium according to the present invention.
Figure 20:
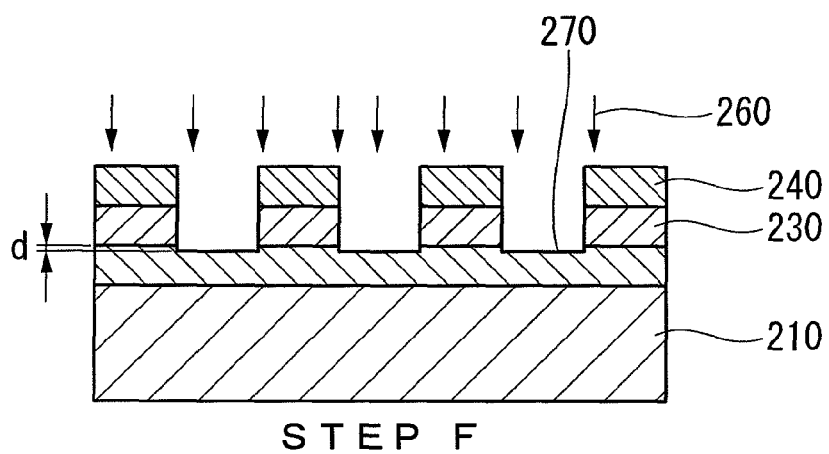
FIG. 20 is a diagram illustrating one step in an example of the method for manufacturing a magnetic recording medium according to the present invention.
Figure 21:
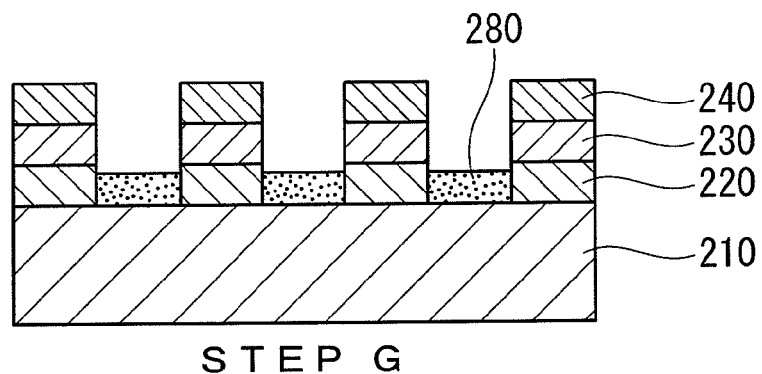
FIG. 21 is a diagram illustrating one step in an example of the method for manufacturing a magnetic recording medium according to the present invention.
Figure 22:
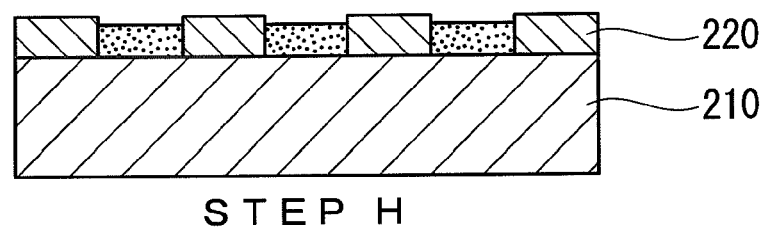
FIG. 22 is a diagram illustrating one step in an example of the method for manufacturing a magnetic recording medium according to the present invention.
Figure 23:
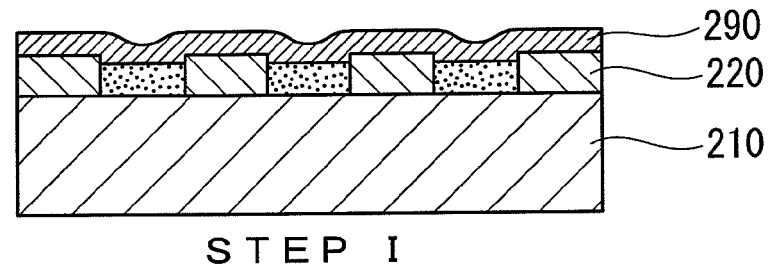
FIG. 23 is a diagram illustrating one step in an example of the method for manufacturing a magnetic recording medium according to the present invention.

Namely, the method includes a step A of forming at least a magnetic layer 220 on a non-magnetic substrate 210 (see FIG. 15), a step B of forming a mask layer 230 on top of the magnetic layer 220 (see FIG. 16), a step C of forming a resist film 240 on top of the mask layer 230 (see FIG. 17), a step D of transferring a negative pattern of the magnetic recording pattern to the resist film 240 using a resin mold 250 (the arrow illustrated for step D indicates the movement of the resin mold 250, wherein the downward-pointing arrow represents the step of pressing the resin mold 250 against the resist film 240, and the upward-pointing arrow represents the step of detaching the resin mold 250 from the substrate 210) (see FIG. 18), a step E of removing those portions of the mask layer 230 corresponding with the negative pattern of the magnetic recording pattern (the portions of the mask layer 230 beneath the grooves shown in FIG. 18 that represents step D) (in those cases where portions of the resist film 240 remain within the grooves following step D, both the resist film 240 and the mask layer 230 are removed) (see FIG. 19), a step F of partially ion milling the surface of the magnetic layer 220 from the side of the resist film 240 (numeral 270 indicates a position on the magnetic layer that has been subjected to partially ion milling, and the symbol d represents the depth of ion milling performed on the magnetic layer) (see FIG. 20), exposing the ion milled portions of the magnetic layer 220 to a reactive plasma or reactive ions 270, thereby modifying the magnetic properties of the magnetic layer 220 (numeral 280 represents locations within the magnetic layer having modified magnetic properties) (see FIG. 21), a step H of removing the resist film 240 and the mask layer 230 (see FIG. 22), a step of irradiating the magnetic layer 220 with an inert gas, and a step I of coating the surface of the magnetic layer 220 with a protective film 290 (see FIG. 23).

In step B of the manufacturing method, the mask layer 230 formed on top of the magnetic layer 220 is preferably formed from a material containing one or more substances selected from the group consisting of Ta, W, Ta nitride, W nitride, Si, SiO$_2$, Ta$_2$O$_5$, Re, Mo, Ti, V, Nb, Sn, Ga, Ge, As and Ni. By using such a material, the shielding properties of the mask layer 230 relative to the milling ions 260 can be improved, and the magnetic recording pattern-forming properties of the mask layer 230 can be improved. Moreover, because these substances can be readily subjected to dry etching using a reactive gas, the amount of residues left in step H is reduced, enabling a reduction in contamination of the surface of the magnetic recording medium.

In this manufacturing method, of the substances listed above, the mask layer 230 is preferably composed of As, Ge, Sn, Ga, Ni, Ti, V, Nb, Mo, Ta, W or C, is more preferably composed of Ni, Ti, V, Nb, Mo, Ta or W, and is most preferably composed of Mo, Ta or W. The thickness of the mask layer 230 is preferably within a range from 1 to 20 nm.

Subsequently, in step C, a resist is coated onto the magnetic layer 220 with the mask layer 230 disposed therebetween, thus forming the resist film 240. Any resist that exhibits favorable transfer properties relative to the resin mold may be used, although the use of a resin that exhibits curability upon irradiation is preferred. For example, the use of an ultraviolet light-curable resin such as a novolak resin, acrylate ester or alicyclic epoxy resin is preferred.

Next, in step D, the resin mold 250 having a pattern of protrusions and recesses formed thereon is pressed against the resist film 240 to transfer the pattern on the resin mold 250 to the resist film 240, and the mold 250 is then detached from the substrate 210. At this point, the pressure with which the resin mold 250 is pressed against the resist film 240 is typically not more than 60 MPa. This pressure can be calculated as compression force/mold surface area, or in other words, can be determined by dividing the loading detected by the press machine by the surface area of the mold. Further, the resin mold 250 can be formed with any desired shape. For example, the resin mold may be a circular disc shape in which both the outer peripheral portion and the inner peripheral portion have been punched out. In the manufacturing method of this example, as mentioned above and as illustrated in FIG. 24, the use of a long resin mold 250 in which an identical pattern is provided continuously along the resin mold is preferable from the viewpoint of improving the productivity of the magnetic recording medium.

Figure 24:
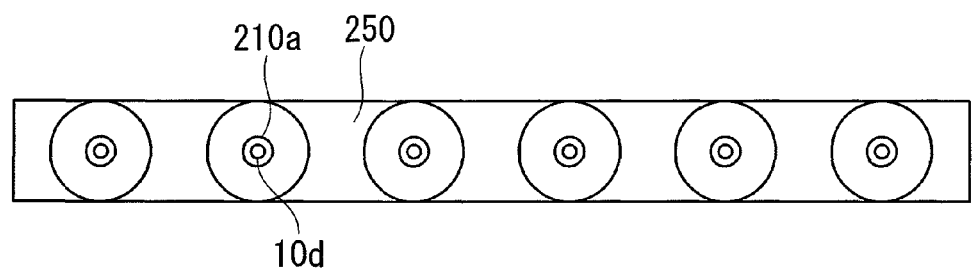
FIG. 24 is a diagram illustrating a long mold.

Further, as illustrated in FIG. 24, by providing openings 10d in the long mold 250, performing a positioning process so that these openings 10d coincide with openings formed in advance within the substrate 210, subsequently pressing the mold 250 against the substrate 210 with a radiation-transmitting jig, and then irradiating the radiation for curing the resist film 240 through the mold from the side of the jig, the magnetic recording medium can be manufactured at a high level of productivity.

Furthermore, in the example shown in FIG. 24, because a mold with an identical repeating pattern is provided in a continuous manner, each of the steps can be performed continuously, and both sides of the magnetic recording medium can be easily processed at the same time.

In the present manufacturing method, the thickness of the grooves within the resist film 240 following transfer of the negative pattern of the magnetic recording pattern to the resist film 240 is preferably within a range from 0 to 10 nm. By ensuring that the thickness of the grooves within the resist film 240 satisfies this range, the step of etching the mask layer 230 illustrated in step E can be performed without sagging of the edge portions of the mask layer 230, the shielding properties of the mask layer 230 relative to the milling ions 260 can be improved, and the magnetic recording pattern formability provided by the mask layer 230 can be improved. The thickness of the resist is typically within a range from approximately 10 to 100 nm.

The material used for the resist film 240 in steps C and D is preferably a radiation-curable material. Irradiation of the resist may be performed at the same time as the step of transferring the pattern to the resist film 240 using the mold 250, or alternatively, the resist film 240 may be irradiated following the pattern transfer step. By using this type of manufacturing method, the pattern from the mold 250 can be transferred to the resist film 240 with good precision. As a result, the step of etching the mask layer 230 illustrated in step E can be performed without sagging of the edge portions of the mask layer 230, and therefore the shielding properties of the mask layer 230 relative to the injected ions in the following step can be improved. Further, the magnetic recording pattern formability provided by the mask layer 230 can also be improved. In the present invention, the term "radiation" is a broad concept describing all manner of electromagnetic waves, including heat rays, visible radiation, ultraviolet rays, X-rays and gamma rays. Furthermore, a radiation-curable material describes any material that exhibits such properties, and for example, a heat-curable resin can be used when irradiation with heat rays is performed, whereas an ultraviolet-curable resin can be used when irradiation with ultraviolet rays is performed.

In the step of transferring the pattern of protrusions and recesses from the mold to the resist film, from the viewpoint of selecting a radiation that is generally accessible and yet also provides improved productivity, ultraviolet radiation having a wavelength within a range from 300 to 400 nm is preferred.

The present manufacturing method preferably includes the step described below. Namely, during the step of transferring the pattern to the resist film 240 using the mold 250, the mold 250 is preferably pressed against the resist film 240 while the resist film 240 is still in a state of high fluidity, the resist film 240 then cured by irradiation while the mold 250 is pressed against the resist film 240, and the mold 250 then detached from the resist film 240. By employing this method, the shape of the resin mold 250 can be transferred to the resist film 240 with superior precision.

The method used for irradiating the resist film 240 while the mold 250 is still pressed against the resist film 240 may be selected as required, and methods that may be used include a method in which irradiation is performed from the opposite side of the resin mold 250, a method in which irradiation is performed from the side of the substrate 210, a method in which irradiation is performed from the side surfaces of the mold 250, and a method in which a type of radiation such as heat that exhibits high conductivity relative to solids is irradiated by heat conduction through either the mold material or the substrate 210.

By using this type of manufacturing method, the magnetic properties of the regions between magnetic tracks (the regions that divide the magnetic layer 220) can be reduced, and for example, the coercive force and the residual magnetization can be reduced to minimum levels. As a result, fringing during magnetic recording is eliminated, and a magnetic recording medium having a high surface recording density can be obtained.

In the present manufacturing method, as illustrated in step F, a portion of the surface of the magnetic layer 220 is preferably removed by ion milling or the like. By using the technique employed in the present manufacturing method wherein a portion of the magnetic layer 220 is removed, and the surface of the magnetic layer 220 is then exposed to a reactive plasma and/or reactive ions in order to modify the magnetic properties of the magnetic layer 220, the magnetic recording pattern contrast is sharpened and the S/N of the magnetic recording medium is improved compared with the case where this partial removal of the magnetic layer 220 is not performed. It is thought that the reason for these effects is that removing the surface portion of the magnetic layer 220 not only cleans and activates the surface, thereby enhancing the reactivity with the reactive plasma or reactive ions, but also introduces defects such as vacancies at the surface of the magnetic layer 220, with these defects then facilitating the penetration of reactive ions into the magnetic layer 220.

The depth d that is removed by ion milling or the like from the portion of the surface of the magnetic layer 220 is preferably within a range from 0.1 to 15 nm, and more preferably from 1 to 10 nm. If the depth removed by ion milling is less than 0.1 nm, then the above effects achieved by removing a portion of the magnetic layer 220 are not obtained, whereas if the depth removed exceeds 15 nm, then the surface smoothness of the magnetic recording medium tends to deteriorate, resulting in a deterioration in the magnetic head floating properties when manufacturing a magnetic recording/reproducing apparatus.

In the present manufacturing method, the regions that magnetically separate the magnetic recording tracks and the servo signal pattern portions can be formed by exposing the already deposited magnetic layer 220 to a reactive plasma or reactive ions, thereby modifying the magnetic properties (reducing the magnetic properties) of the magnetic layer 220.

In this description, a "magnetically separated magnetic recording pattern" describes a state where, as described for step G, if the magnetic recording medium is viewed from the surface, then the magnetic layer 220 is divided by regions 280 that have been subjected to demagnetization or the like. Provided the magnetic layer 220 appears divided when viewed from the surface, then even if the bottom portion of the magnetic layer 220 remains undivided, the objects of the present invention can still be achieved, and such a configuration is deemed to be included within the definition of a magnetically separated magnetic recording pattern. Further, examples of the magnetic recording pattern include so-called patterned media in which each bit of the magnetic recording pattern is aligned with uniform regularity, media in which the magnetic recording pattern is arranged in a track-like form, as well as other patterns such as servo signal patterns.

Of these, application of the manufacturing method of the present invention to a so-called discrete magnetic recording medium wherein the magnetically separated magnetic recording pattern is composed of magnetic recording tracks and a servo signal pattern is preferred in terms of the simplicity of the manufacturing process.

In the present manufacturing method, modification of the magnetic properties of the magnetic layer 220 in order to form the magnetic recording pattern describes the process of changing the coercive force and residual magnetization and the like of portions of the magnetic layer 220 in order to achieve favorable patterning of the magnetic layer 220. These changes typically involve reducing the coercive force and reducing the residual magnetization.

Moreover, in the present manufacturing method, the locations that magnetically separate the magnetic recording tracks and the servo signal pattern, namely those locations having reduced magnetic properties, can also be realized by exposing the already deposited magnetic layer 220 to a reactive plasma or reactive ions to cause amorphization of the magnetic layer 220. In other words, modification of the magnetic properties of the magnetic layer 220 may also be achieved by modifying the crystal structure of the magnetic layer 220. In this description, amorphization of the magnetic layer 220 describes the process of altering the atomic arrangement of the magnetic layer 220 to an irregular atomic arrangement that lacks long-range order, or more specifically, describes the process of producing a state in which microcrystalline grains of less than 2 nm are positioned in a random arrangement. The existence of this type of atomic arrangement can be confirmed using analytical techniques such as X-ray diffraction or electron beam diffraction, by the lack of peaks attributable to crystal planes or the detection of only halos.

Examples of the reactive plasma used for modifying the magnetic layer 220 include inductively coupled plasma (ICP) and reactive ion plasma (RIE). Further, examples of the reactive ions include reactive ions contained within the above-mentioned inductively coupled plasma or reactive ion plasma.

An inductively coupled plasma is a high-temperature plasma obtained by applying a high voltage to a gas to generate a plasma, and applying a high-frequency variable magnetic field to generate Joule heat within the plasma using eddy currents. An inductively coupled plasma has a high electron density, and therefore compared with the case in which a discrete track media is manufactured using a conventional ion beam, the magnetic properties of the magnetic layer 220 can be modified with good efficiency even for a large surface area magnetic layer 220. A reactive ion plasma is a high-reactivity plasma obtained by adding a reactive gas such as $O_2$, $SF_6$, $CHF_3$, $CF_4$ or $CCl_4$ to the plasma. The use of this type of plasma as the reactive plasma makes it possible to modify the magnetic properties of the magnetic layer 220 with a higher degree of efficiency.

In the manufacturing method of the present invention, the reactive plasma or reactive ions preferably include halogen ions. Further, it is preferable that the halogen ions are formed by introducing at least one halogenated gas selected from the group consisting of $CF_4$, $SF_6$, $CHF_3$, $CCl_4$ and KBr into the reactive plasma, as this enhances the reactivity of the plasma with the magnetic layer 220, and further improves the precision of the formed pattern. The reasons for these observations are not entirely clear, but it is thought that the halogen atoms within the reactive plasma etch away foreign matter existing on the surface of the magnetic layer 220, thereby cleaning the surface of the magnetic layer 220 and enhancing the reactivity of the magnetic layer 220. Furthermore, it is thought that the cleaned surface of the magnetic layer 220 and the halogen atoms then react with a high level of reactivity.

In the above example of the manufacturing method, the formed magnetic layer 220 is modified by exposure to a reactive plasma, and this modification is preferably realized through a reaction between the magnetic metal that constitutes the magnetic layer 220 and the atoms or ions within the reactive plasma. Examples of this reaction include penetration into the magnetic metal of atoms or the like within the reactive plasma, thereby altering the crystal structure of the magnetic metal, change in the composition of the magnetic metal, oxidation of the magnetic metal, nitridation of the magnetic metal, and silicidation of the magnetic metal.

In the present manufacturing method, in the next step, the resist film 240 and the mask layer 230 are removed, as illustrated in step H. A technique such as dry etching, reactive ion etching, ion milling or wet etching or the like may be used in this step.

In this manufacturing method, subsequently, as illustrated in step I, an inert gas is irradiated onto the magnetic layer 220 that has been activated in steps F, G and H, thereby stabilizing the magnetic layer 220. By providing this type of step, the magnetic layer 220 can be stabilized, and migration of the magnetic grains, even under conditions of high temperature and high humidity, can be suppressed. Although the reasons for this effect are not entirely clear, for example, it is thought that by introducing an inert element at the surface of the magnetic layer 220, migration of the magnetic grains can be suppressed, or that irradiation of the inert gas removes the active surface from the magnetic layer 220, thus suppressing migration and the like of the magnetic grains.

The inert gas is preferably one or more gases selected from the group consisting of Ar, He and Xe. These elements are stable, and exhibit good suppression of migration and the like of the magnetic grains. The irradiation of the inert gas is preferably conducted using a method selected from the group consisting of an ion gun, ICP and RIE. Of these methods, the use of ICP or RIE is particularly preferable in terms of the large volume of gas that can be irradiated. The ICP and RIE methods are as described above.

In the present manufacturing method, as illustrated in step I, a protective film 290 is preferably formed, and a lubricant is then applied to complete the manufacture of the magnetic recording medium. Formation of the protective film 290 is typically achieved by using a deposition method such as P-CVD to deposit a thin film of diamond-like carbon, although the present invention is not limited to this particular configuration. Typically employed protective film materials may be used as the protective film, including carbon-based material layers such as carbon (C), carbon hydrides ($H_xC$), carbon nitride (CN), amorphous carbon and silicon carbide (SiC), as well as $SiO_2$, $Zr_2O_3$ and TiN and the like. Further, the protective film may also be composed of two or layers.

The thickness of the protective film 290 is preferably less than 10 nm. If the thickness of the protective film exceeds 10 nm, then the distance between the head and the magnetic layer 220 is increased, increasing the possibility that a satisfactory output signal strength may be unobtainable.

A lubricant layer is preferably formed on top of the protective film 290. Examples of the lubricant used for the lubricant layer include fluorine-based lubricants, hydrocarbon-based lubricants, and mixtures thereof. The lubricant layer is preferably formed with a thickness of 1 to 4 nm.

In this method for manufacturing a magnetic recording medium, during the transfer of the pattern of protrusions and recesses from the resin mold 250 to the resist film 240, radiation for curing the resist film 240 can be irradiated onto the resist film 240 from the rear surface of the resin mold 250. As a result, the mask layer 230 used for forming the magnetic recording pattern on the surface of the magnetic layer 220 can be formed in a short period of time, enabling an increase in the productivity of the magnetic recording medium.

Moreover, in the method described above, because a mold having a recessed and protruding pattern that has been transferred from the master mold with a high level of precision can be used, the recording density of the magnetic recording medium can be increased.

The sample method for manufacturing a magnetic recording medium described above includes an ion milling step F, but this step F may be omitted if desired. If step F is omitted, then the surface of the magnetic layer 220 that is exposed by removal of the mask layer is exposed to the reactive plasma or the reactive ions.

Furthermore, in this method for manufacturing a magnetic recording medium, the step of applying the resist to the magnetic layer 220, the step of pressing the resin mold which has a pattern having recessed and protruding portions formed on the mold against the resist, and the step of transferring the pattern from the mold to the resist may be performed simultaneously on both surfaces of the substrate. This double-sided processing is facilitated by the fact that the mold in the present invention is a highly flexible film-like mold, and the fact that, because the film can be formed as an elongated shape, supply of the mold to both surfaces of the magnetic recording medium substrate, and subsequent pressing, pattern transfer, detachment and recovery can be performed with comparative ease.

(Applications of Magnetic Recording Medium)

The magnetic recording medium obtained using the manufacturing method described above can be used in a magnetic recording/reproducing apparatus or the like.

Figure 25:
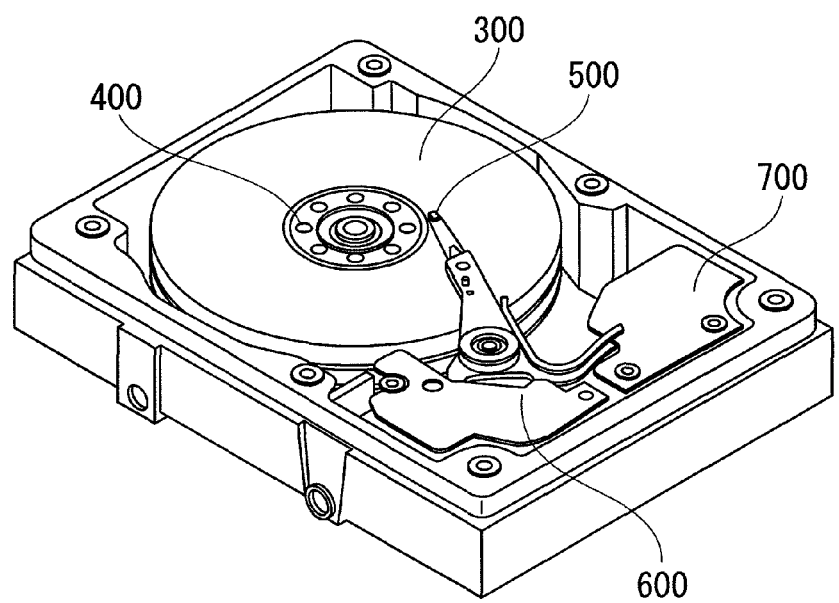
FIG. 25 is a diagram that schematically illustrates an example of a magnetic recording/reproducing device.

One example of a magnetic recording/reproducing apparatus that uses the magnetic recording medium is illustrated in FIG. 25. This magnetic recording/reproducing apparatus includes a magnetic recording medium 300 of the present invention obtained using the method described above, a medium drive unit 400 that drives the magnetic recording medium in the recording direction, a magnetic head 500 composed of a recording unit and a reproduction unit, a drive unit 600 that moves the magnetic head 500 relative to the magnetic recording medium 300, and a recording/reproducing signal system 700 that includes a combination of recording and reproducing signal processing devices for performing signal input to the magnetic head 500 and reproducing signal output from the magnetic head 500. By employing this configuration, a magnetic recording apparatus having a high recording density can be produced. Because the recording tracks of the magnetic recording medium are magnetically discontinuous, that is, because a non-magnetic layer is sandwiched between adjacent recording tracks to reduce magnetic interference between tracks, the conventional technique of reducing the width of the reproduction head to a width narrower than that of the recording head in order to eliminate the effects of magnetized transition regions that exist at the track edges of conventional media need not be employed, and the two heads may be operated at substantially the same width. As a result, a superior reproduction output and improved SNR can be achieved.

Moreover, by forming the reproduction unit of the above-mentioned magnetic head as a GMR head or TMR head, adequate signal strength can be obtained even in the case of a high recording density, meaning a high-recording density magnetic recording apparatus can be obtained. Furthermore, if the floating height of the magnetic head is set within a range from 0.005 to 0.020 µm, which is lower than conventional floating heights, then the output can be improved, a higher apparatus SNR is obtained, and a high-capacity, high-reliability magnetic recording apparatus can be provided. Furthermore, if a signal processing circuit that employs maximum likelihood decoding is incorporated within the apparatus, then the recording density can be further improved, and for example, a satisfactory SNR can be achieved for the recording and reproduction of a track density of 100 k-track/inch or higher, a linear recording density of 1,000 kbit/inch or higher, and a recording density per square inch of 100 Gbit or higher.

EXAMPLES

The present invention is described in more detail below using a series of examples, although the present invention is in no way limited by these examples.

Example of the First and Second Aspects

Preparation of curable resin material 77.4 parts by mass of BEAMSET 371 (an acrylic monomer, manufactured by Arakawa Chemical Industries, Ltd.), 6.0 parts by mass of a 25% by mass acetone solution of IRGACURE 127 (a photopolymerization initiator, manufactured by Ciba Specialty Chemicals Inc.), 2.5 parts by mass of MEGAFAC R-30 (a fluorine-containing surfactant, manufactured by DIC Corporation) and 16.4 parts by mass of ethyl acetate (a diluent solvent) were combined and blended together to form a solution of an ultraviolet-curable resin material.

The viscosity of this curable resin material was 59.1 mPa·s, and following curing, the cured product exhibited a light transmittance of 65% for radiation of wavelength 365 nm, and a tensile elastic modulus at a temperature of 25° C. of 0.03 GPa.

(Manufacture of Laminated Film)

The thus obtained curable resin material solution was applied to a base film (the base material 12) of polyethylene terephthalate that had been subjected to an adhesion-improving treatment (manufactured by Toyobo Co., Ltd., thickness: 50 μm, width: 100 mm, length: 1,000 m).

Subsequently, the diluent solvent was removed by evaporation, forming an ultraviolet-curable resin material layer 13 with a thickness of 30 μm, a width of 100 mm and a length of 1,000 m (viscosity: 2 Pa·s).

A silicone-treated polyethylene terephthalate film (thickness: 16 μm, width: 100 mm, length: 1,000 m) was then bonded as a cover film (the base material 11) to the curable resin material layer 13, yielding a laminated film in which the curable resin material layer was sandwiched between the base film and the cover film.

(Sealing of the Curable Resin Material)

Flow suppression bodies were formed in a continuous manner along both edges of the laminated film in the widthwise direction by irradiating the laminated film with ultraviolet light (365 nm, 36 mW/m$^2$) across an irradiation area of 90 mm×10 mm, and the irradiated laminated film was wound onto a roll at a winding rate of 1,080 mm/minute, using a cylindrical winding core made of an ABS resin. This yielded a roll of a laminated body having a length of 150 m and a width of 100 mm in which 10 mm along both edges in the widthwise direction were cured to form flow suppression bodies.

(Manufacture of Replica Molds)

Using the thus obtained laminated body roll and a master mold, replica molds were manufactured.

A stamper was used as the master mold, and was prepared by forming, on the surface of a nickel electrocast doughnut-shaped disc having a thickness of 0.3 mm, an inner diameter of 16 mm and an outer diameter of 63.5 mm, a plurality of concentric patterns in which the protruding height (the land height) was 80 nm, the land width was 120 nm and the groove width was 80 nm.

The master mold was attached to a stamper apparatus with the patterned surface of the master mold facing downward. Subsequently, the laminated body described above was supplied to the stamper apparatus with the surface of the cover film facing upward, so that the surface of the cover film was facing the patterned surface of the master mold.

Subsequently the cover film was detached from the laminated body, and the master mold was pressed against the exposed curable resin material layer for 10 seconds with a pressure of 30 MPa. With this state maintained, ultraviolet light was irradiated for 20 seconds from an ultraviolet irradiation device (an LED lamp with a wavelength of 365 nm) that had been set to an irradiation intensity of 30 mW/cm$^2$, thereby curing the curable resin material. Irradiation of the ultraviolet light was then stopped, and the master mold was raised and detached from the laminated body, yielding a replica mold having a transferred pattern within the curable resin material layer. The above process was repeated continuously, yielding 1,500 replica molds from the laminated body roll.

(Evaluation of Replica Molds)

The 1,500 obtained replica molds were inspected and the defect rate for the transferred pattern was determined. The defect rate was calculated by specifying those replica molds in which 3% or more of all the concentric patterns included pattern transfer defects as defective items. The result of the evaluation was a defect rate of less than 2%, confirming that the replica molds were able to be manufactured with excellent precision and at a high level of productivity.

Example of the Third Aspect

Preparation of Curable Resin Material

Preparation of the curable resin material was conducted in the same manner as that described for the example of the first and second aspects.

(Manufacture of Laminated Film and Replica Molds)

A laminated film and replica molds were manufactured in the same manner as that described for the example of the first and second aspects.

(Preparation of Magnetic Recording Medium Substrate with Attached Resist Film)

A glass substrate for the magnetic recording medium was placed inside a vacuum chamber, and the inside of the vacuum chamber was evacuated down to a pressure of not more than $1.0 \times 10^{-5}$ Pa. The glass substrate was formed of a crystallized glass containing $Li_2Si_2O_5$, $Al_2O_3$—$K_2O$, $MgO$—$P_2O_5$ and $Sb_2O_3$—$ZnO$ as components, and had an outer diameter of 65 mm, an inner diameter of 20 mm, and an average surface roughness (Ra) of 2 angstroms.

Using a DC sputtering method, thin films of 65Fe-30Co-5B as a soft magnetic layer, Ru as an intermediate layer, and 74Co-6Cr-18Pt-2SiO$_2$ alloy as a magnetic layer (wherein the shown numbers indicate the molar ratio) were deposited sequentially on the glass substrate. The thicknesses of each of these layers was 60 nm for the FeCoB soft magnetic layer, 10 nm for the Ru intermediate layer, and 15 nm for the magnetic layer. A sputtering method was then used to form a mask layer on top of the magnetic layer. Ta was used for the mask layer, and the thickness was 60 nm. A resist film was then formed on both surfaces of the magnetic recording medium by using a spin coating method to apply a resist. As the resist, an ultraviolet-curable resin PAK-01 (manufactured by Toyo Gosei Co., Ltd.) was used. The resin was diluted with a solvent to enable the formation of resist films having a thickness of 100 nm.

<Imprinting Using Resin Replica Molds>

A resin replica mold described above was positioned on the magnetic recording medium so that the relief patterned surface of the mold wherein recessed and protruding portions are formed was facing the resist film of the magnetic recording medium, and the structure was then sandwiched from both sides using a pair of quartz jigs. One of the quartz jigs was provided with a circular cylindrical rod of diameter 20 mm arranged perpendicularly to the resist film, and this rod was used for positioning the magnetic recording medium substrate and the resin replica mold. A hole was formed in the other quartz jig to accommodate the cylindrical rod. The two quartz jigs were pressed together with a pressure of 0.6 MPa for 10 seconds, and then, without altering the pressure, ultraviolet light with an intensity of 30 mW/cm$^2$ and a wavelength of 365 nm was irradiated from an LED lamp through the quartz jig on the side of the replica mold. Subsequently, the replica mold was removed from the magnetic recording medium, and the replica mold was recovered using a film winding apparatus.

The thickness of the resist film (lands) on the substrate surface following removal of the replica mold was 80 nm, whereas the thickness of the resist film grooves was approximately 5 nm. Further, the angle relative to the substrate with which the grooves were formed in the resist film was substantially 90 degrees.

<Formation of Magnetic Recording Pattern and Evaluation of Properties>

Subsequently, the portions of the resist film within the groves and the corresponding portions of the underlying Ta layer (mask layer) were removed by dry etching. The dry etching conditions used for etching the portions of the resist film within the grooves included an $O_2$ gas flow rate of 40 sccm, a pressure of 0.3 Pa, high-frequency plasma electric power of 300 W, a DC bias of 30 W, and an etching time of 10 seconds. The conditions for etching the Ta layer included a $CF_4$ gas flow rate of 50 sccm, a pressure of 0.6 Pa, high-frequency plasma electric power of 500 W, a DC bias of 60 W, and an etching time of 30 seconds.

Following etching, the exposed portions of the magnetic layer formed by the above steps and no longer covered by the mask layer were subjected to ion milling to remove the surface of the magnetic layer. Ar ions were used for the ion milling. The ion milling conditions included a high-frequency discharge power of 800 W, an acceleration voltage of 500 V, a pressure of 0.014 Pa, an Ar flow rate of 5 sccm, a processing time of 40 seconds, and a current density of 0.4 $mA/cm^2$. The ion milled surface portions were then exposed to a reactive plasma, thereby modifying the magnetic properties of the magnetic layer within those portions. An inductively coupled plasma apparatus NE550 manufactured by ULVAC, Inc. was used for the reactive plasma processing of the magnetic layer. The gas and conditions used for generating the plasma included introducing $CF_4$ at a flow rate of 90 cc/minute, using an applied electric power of 200 W to generate the plasma, setting the apparatus pressure to 0.5 Pa, and processing the magnetic layer for a period of 300 seconds.

Subsequently, all of the remaining resist film and mask layer were removed by dry etching. The dry etching conditions included a $SF_6$ gas flow rate of 100 sccm, a pressure of 2.0 Pa, high-frequency plasma electric power of 400 W, and a processing time of 300 seconds. An inert gas plasma was then irradiated onto the surface of the magnetic layer. The inert gas plasma irradiation conditions included an inert gas flow rate of 5 sccm, a pressure of 0.014 Pa, an acceleration voltage of 300 V, a current density of 0.4 $mA/cm^2$, and a processing time of 10 seconds. A CVD method was then used to deposit a 4 nm protective film of carbon (DLC: diamond-like carbon) on the surface of the magnetic layer, and a lubricant was then applied to complete the manufacture of the magnetic recording medium.

The defect rate among the formed patterns was determined for the magnetic recording media manufactured in this example. The defect rate was calculated by specifying those media in which 3% or more of the tracks formed on the magnetic recording medium surface included pattern formation defects as defective items. The result of the evaluation was a defect rate of 3.3% for the magnetic recording media manufactured using the resin molds of this example, confirming that the magnetic recording media were able to be manufactured with excellent precision and at a high level of productivity.

INDUSTRIAL APPLICABILITY

The present invention provides a laminated body for manufacturing a resin mold that enables a resin replica mold which has a fine pattern of protrusions and recesses formed on the mold to be manufactured with superior precision, in large quantities, and at a high level of productivity, as well as providing a method for manufacturing the laminated body. Further, the present invention also provides a method for manufacturing a magnetic recording medium that enables a magnetic recording medium which is capable of realizing a high recording density to be manufactured inexpensively and at a high level of productivity.

DESCRIPTION OF THE REFERENCE SYMBOLS

10, 10a: Laminated body
11, 12: Base material
13: Curable resin material layer
14: First flow suppression body
15: Second flow suppression body
20: Master mold
30: Resin mold (mold)
100: Resin mold manufacturing apparatus
110: Upper set
111: First mounting plate
111a, 111b: Aperture
112: Cutter set member
114: Outer circumferential cutter portion
114a: Inner circumferential surface
115: Inner circumferential cutter portion
116: Cutter member
117: Outer circumferential cutter blade
117a: Cutting surface
117b: Outside cutting surface
118: Inner circumferential cutter blade
118a: Cutting surface
118b: Concave portion
120: Lower set
121: Second mounting plate
130: Radiation source support mechanism
140: Irradiation device
150: Support member
160: Radiation-transmitting pressing base
170: Inside sliding support member (support member)
171: Recessed portion
180: Outside sliding support member (support member)
190: Mount
191: Elastic member
210: Substrate
220: Magnetic layer
230: Mask layer
240: Resist film
250: Mold
260: Milling ions
290: Protective film
300: Magnetic recording medium
400: Medium drive unit
500: Magnetic head
600: Head drive unit
700: Recording/reproducing signal system

The invention claimed is:

1. A method for manufacturing a resin mold comprising; forming a laminated body which forms a resin mold by compression molding using a master mold, said laminated body comprising: a pair of mutually facing base materials, a layer of a liquid or gel-like curable resin material sandwiched between said pair of base materials, and one or more flow suppression bodies, which are composed of a cured product of said curable resin material and are sandwiched between said pair of base materials, wherein said layer of said curable resin material is sealed by said pair of base materials and said flow suppression bodies;

the method further comprising;

detaching one of said base materials from the laminated body which forms a resin mold, thereby exposing said layer of said liquid or gel-like curable resin material, pressing a master mold which has a pattern of protrusions and recesses formed on the mold against said exposed layer of said curable resin material, curing said layer of said curable resin material with said master mold still pressed against said layer, thereby forming a resin mold, and detaching said resin mold from said master mold.

2. The method for manufacturing a resin mold according to claim 1, wherein at least one of the base materials is formed from a transparent synthetic resin.

3. The method for manufacturing a resin mold according to claim 1, wherein at least one of the base materials is a transparent plastic film of polyethylene terephthalate, polyethylene naphthalate, polypropylene, polyethylene, cellulose triacetate, cellulose diacetate, poly(alkyl(meth)acrylate), poly(meth)acrylate copolymers, polyvinyl chloride, polyvinyl alcohol, polycarbonate, polystyrene, cellophane, polyvinylidene chloride copolymers, polyamide, polyimide, vinyl chloride-vinyl acetate copolymers, polytetrafluoroethylene, polytrifluoroethylene, cellulose-based film, nylon film, or a combination thereof.

4. A method for manufacturing a magnetic recording medium having a magnetically separated magnetic recording pattern, said method comprising:

forming a magnetic layer on at least one surface of a substrate, forming a resist film on a surface of said magnetic layer, pressing a resin mold having a pattern of protrusions and recesses formed on the mold against said resist film, thereby transferring said pattern of protrusions and recesses on said resin mold to said resist film, detaching said mold from said resist film, and using said transferred pattern to form a magnetic recording pattern on said magnetic layer, wherein said method also comprises, as a process for forming said mold, sandwiching a liquid or gel-like curable resin material between a pair of mutually opposing base materials, and curing only peripheral portions of said curable resin material to obtain a laminated body, detaching one of said base materials from said laminated body to expose a layer of said liquid or gel-like curable resin material, pressing a master mold having a pattern of protrusions and recesses formed on the mold against said exposed layer of said curable resin material, curing said layer of said curable resin material with said master mold still pressed against said layer, thereby forming a resin mold, and detaching said resin mold from said master mold.

5. The method for manufacturing a magnetic recording medium according to claim 4, wherein a viscosity of said liquid or gel-like curable resin material is not more than 10 Pa·s.

6. The method for manufacturing a magnetic recording medium according to claim 4, wherein said curable resin material is a resin material comprising one or more reactive groups selected from the group consisting of a (meth)acryl group, oxetanyl group, cyclohexene oxide group and vinyl ether group.

7. The method for manufacturing a magnetic recording medium according to claim 4, wherein said curable resin material is a radiation-curable resin material that exhibits curability relative to radiation having a wavelength within a range from 300 to 400 nm, and a cured product of said curable resin material is a cured product obtained by curing said curable resin material by irradiation of radiation.

8. The method for manufacturing a magnetic recording medium according to claim 4, wherein a cured resin of said curable resin material exhibits a transmittance of at least 20% for radiation having a wavelength within a range from 300 to 400 nm, and has a tensile elastic modulus at a temperature of 25° C. of not less than 1.3 GPa.

9. The method for manufacturing a magnetic recording medium according to claim 4, wherein during a step of transferring said pattern of protrusions and recesses from said mold to said resist film, said resist film is cured by irradiation with radiation having a wavelength within a range from 300 to 400 nm.

10. The method for manufacturing a magnetic recording medium according to claim 4, wherein at least one of the base materials is formed from a transparent synthetic resin.

11. The method for manufacturing a magnetic recording medium according to claim 4, wherein at least one of the base materials is a transparent plastic film of polyethylene terephthalate, polyethylene naphthalate, polypropylene, polyethylene, cellulose triacetate, cellulose diacetate, poly(alkyl(meth)acrylate), poly(meth)acrylate copolymers, polyvinyl chloride, polyvinyl alcohol, polycarbonate, polystyrene, cellophane, polyvinylidene chloride copolymers, polyamide, polyimide, vinyl chloride-vinyl acetate copolymers, polytetrafluoroethylene, polytrifluoroethylene, cellulose-based film, nylon film, or a combination thereof.

* * * * *